(12) United States Patent
Yang et al.

(10) Patent No.: US 10,399,853 B2
(45) Date of Patent: Sep. 3, 2019

(54) PRODUCTION OF ALKALI SULFIDE CATHODE MATERIAL AND METHODS FOR PROCESSING HYDROGEN SULFIDE

(71) Applicant: Colorado School of Mines, Golden, CO (US)

(72) Inventors: Yongan Yang, Lakewood, CO (US); Colin A. Wolden, Denver, CO (US); Xuemin Li, Golden, CO (US); Rachel Morrish, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 15/410,511

(22) Filed: Jan. 19, 2017

(65) Prior Publication Data

US 2018/0016144 A1    Jan. 18, 2018

Related U.S. Application Data

(60) Provisional application No. 62/280,531, filed on Jan. 19, 2016.

(51) Int. Cl.
| | |
|---|---|
| *B05D 5/12* | (2006.01) |
| *C01B 17/22* | (2006.01) |
| *C01B 3/32* | (2006.01) |
| *C01B 32/05* | (2017.01) |
| *H01M 4/36* | (2006.01) |
| *H01M 4/136* | (2010.01) |
| *H01M 4/583* | (2010.01) |
| *H01M 4/133* | (2010.01) |
| *H01M 4/134* | (2010.01) |

(52) U.S. Cl.
CPC .......... *C01B 17/22* (2013.01); *C01B 3/32* (2013.01); *C01B 32/05* (2017.08); *H01M 4/133* (2013.01); *H01M 4/134* (2013.01); *H01M 4/136* (2013.01); *H01M 4/366* (2013.01); *H01M 4/583* (2013.01); *C01B 2203/02* (2013.01); *C01B 2203/1217* (2013.01); *C01P 2004/80* (2013.01); *C01P 2006/40* (2013.01)

(58) Field of Classification Search
CPC ............ C01B 17/22; C01B 31/05; C01B 3/32
See application file for complete search history.

(56) References Cited

U.S. PATENT DOCUMENTS

| | | | |
|---|---|---|---|
| 3,642,436 A | 2/1972 | Smith, Jr. | |
| 4,126,666 A | 11/1978 | Jacob et al. | |
| 4,267,396 A * | 5/1981 | Mann | C07C 29/70 568/851 |
| 5,489,701 A * | 2/1996 | Childress | C07F 7/1892 556/427 |
| 6,528,441 B1 * | 3/2003 | Heung | B01J 20/02 420/900 |
| 2007/0128509 A1 * | 6/2007 | Hong | C01B 6/21 429/104 |
| 2014/0037535 A1 | 2/2014 | Miyashita | |

FOREIGN PATENT DOCUMENTS

| | | |
|---|---|---|
| EP | 0802159 A1 | 10/1997 |
| JP | 6293503 * | 10/1994 |
| JP | 2013227180 A | 11/2013 |

OTHER PUBLICATIONS

U.S. Appl. No. 62/033,396, filed Aug. 5, 2014.
U.S. Department of Health and Human Services, "Toxicological Profile for Hydrogen Sulfide and Carbonyl Sulfide," Nov. 2016 (298 pages).

* cited by examiner

*Primary Examiner* — Austin Murata
(74) *Attorney, Agent, or Firm* — Dorsey & Whitney LLP

(57) ABSTRACT

Disclosed herein are methods of producing metal sulfide materials, including cathode materials. In some embodiments, the metal sulfide material comprises a secondary cluster of metal sulfide nanoparticles surrounded by a carbon layer. The carbon layer may be created by carbonizing one or more polymer layers disposed about the secondary cluster. The carbonized layer may aid in optimizing performance of the cathode material. Also disclosed herein are methods, processes, devices, and systems for removing hydrogen sulfide from a waste stream. In some embodiments, the waste stream containing hydrogen sulfide is a gas. The waste stream can be combined with a solvent containing a metal-catalyst complex, and the reaction of hydrogen sulfide with the metal results in production of a hydrogen gas and a solid comprising metal sulfide.

19 Claims, 20 Drawing Sheets

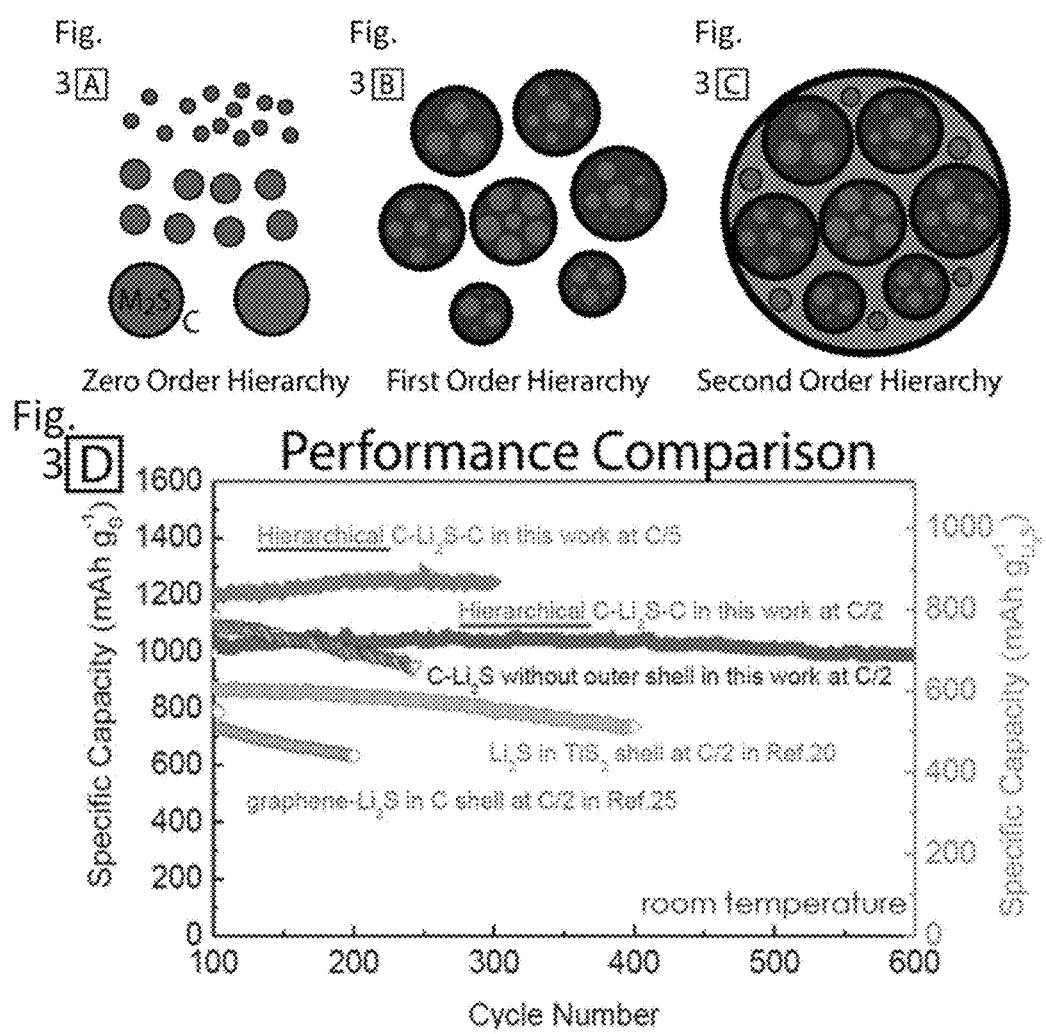

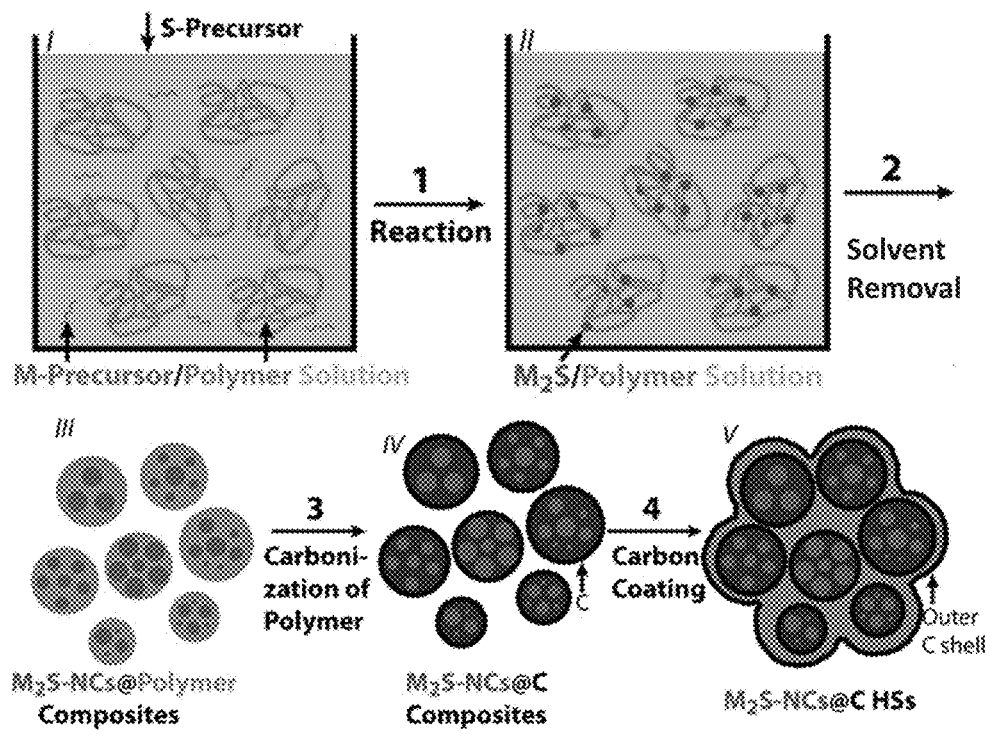
Fig. 8
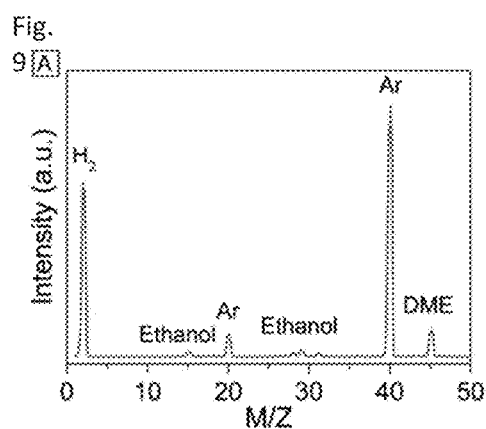
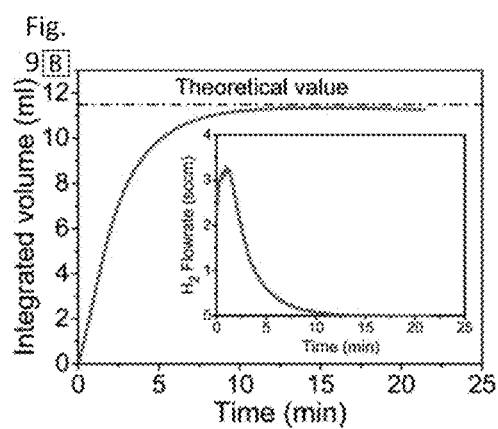

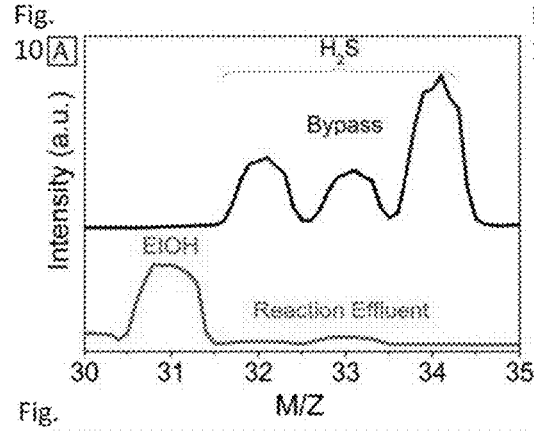
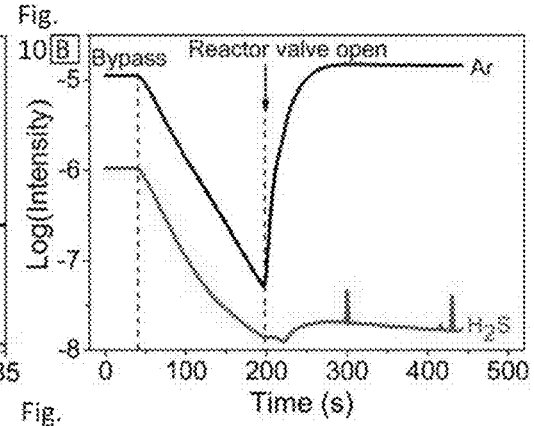
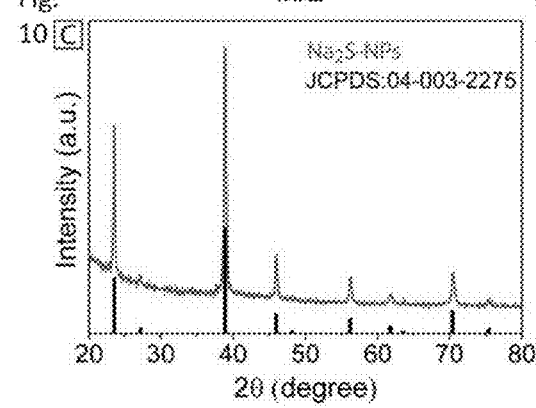
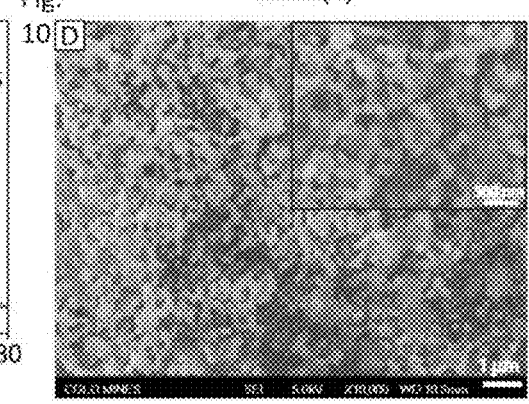

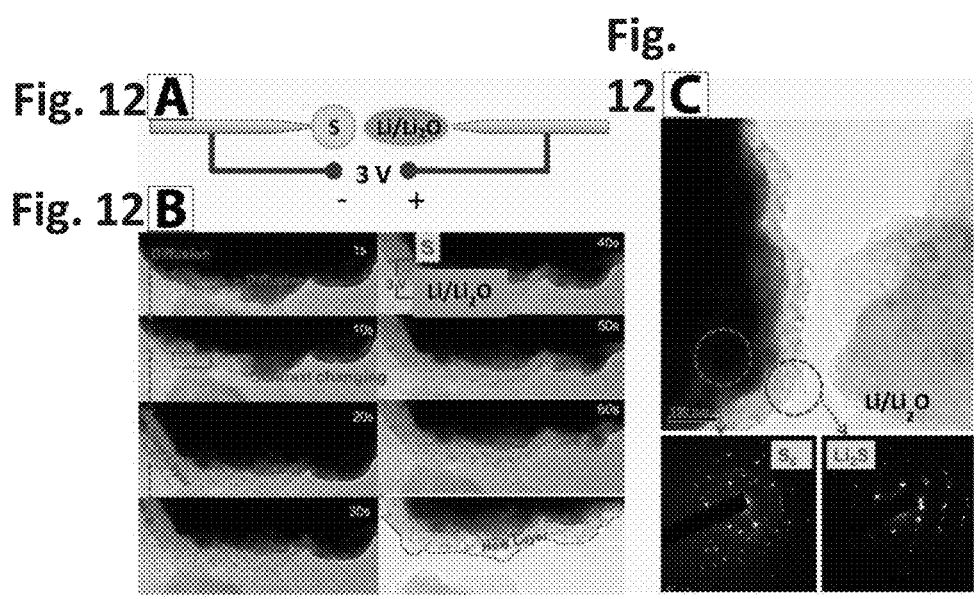

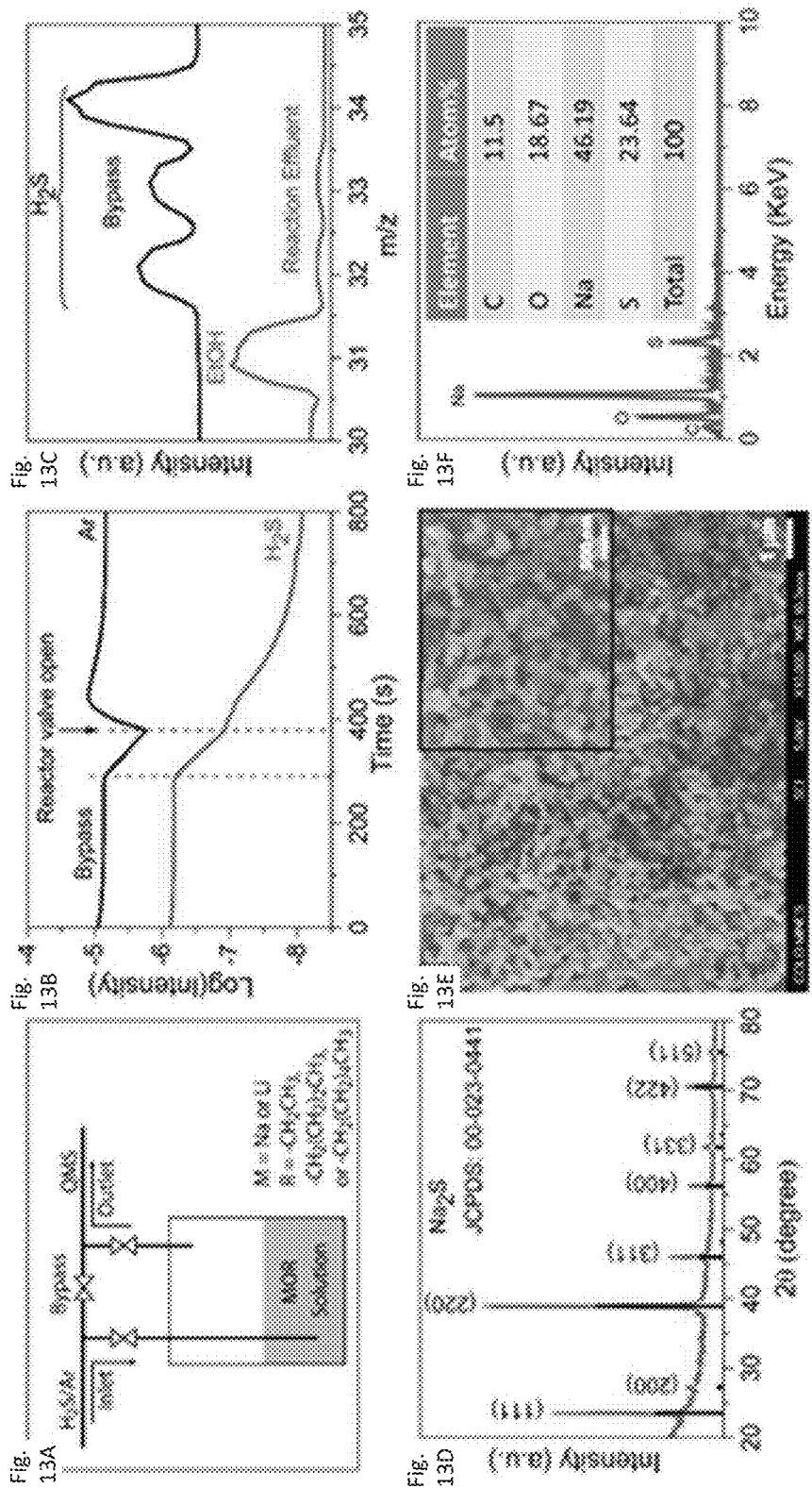

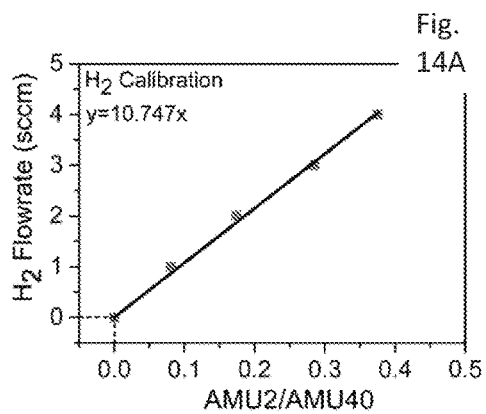
Fig. 14A
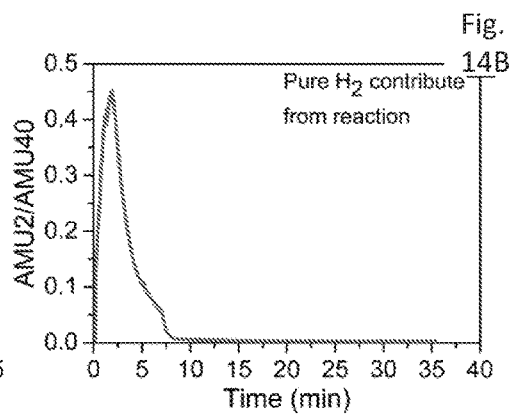
Fig. 14B
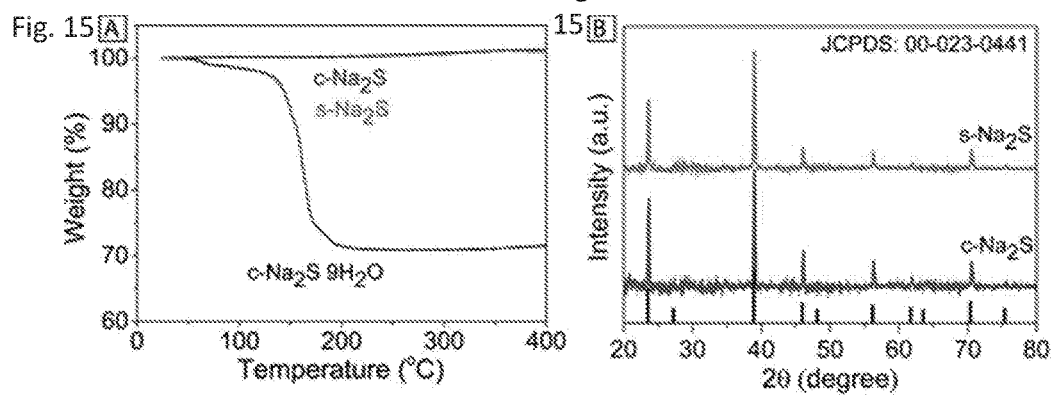
Fig. 15A
Fig. 15B
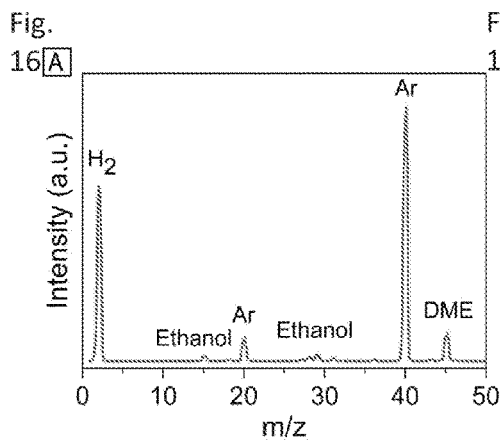
Fig. 16A
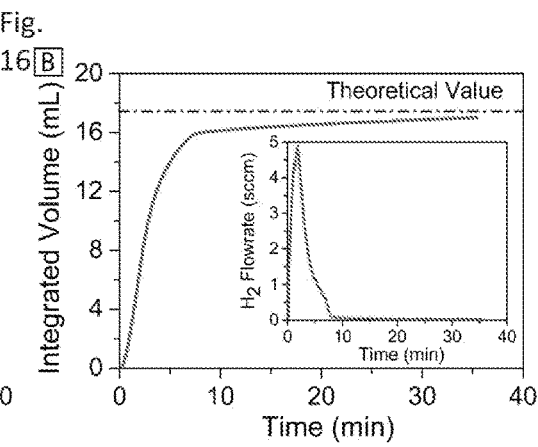
Fig. 16B

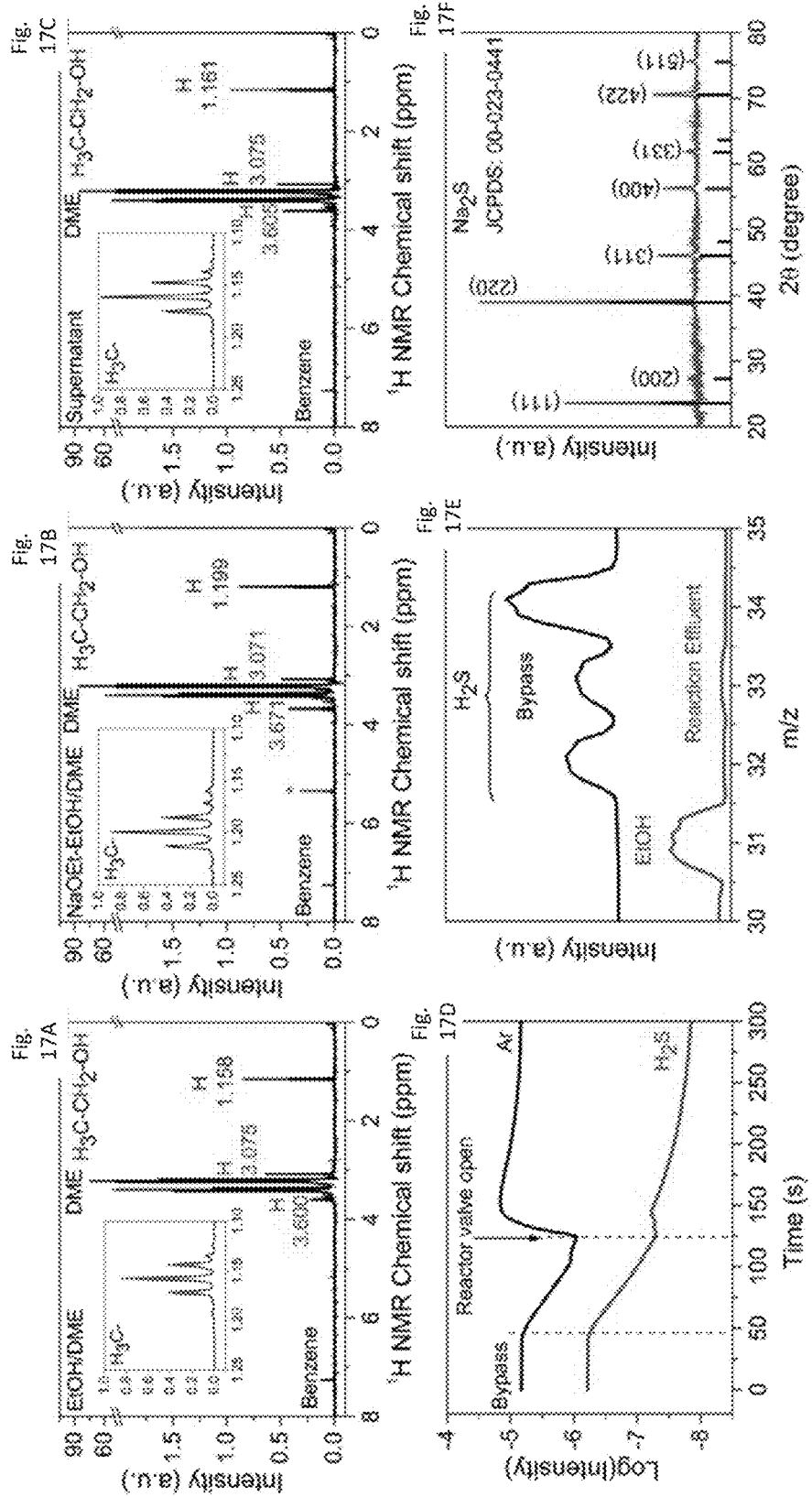

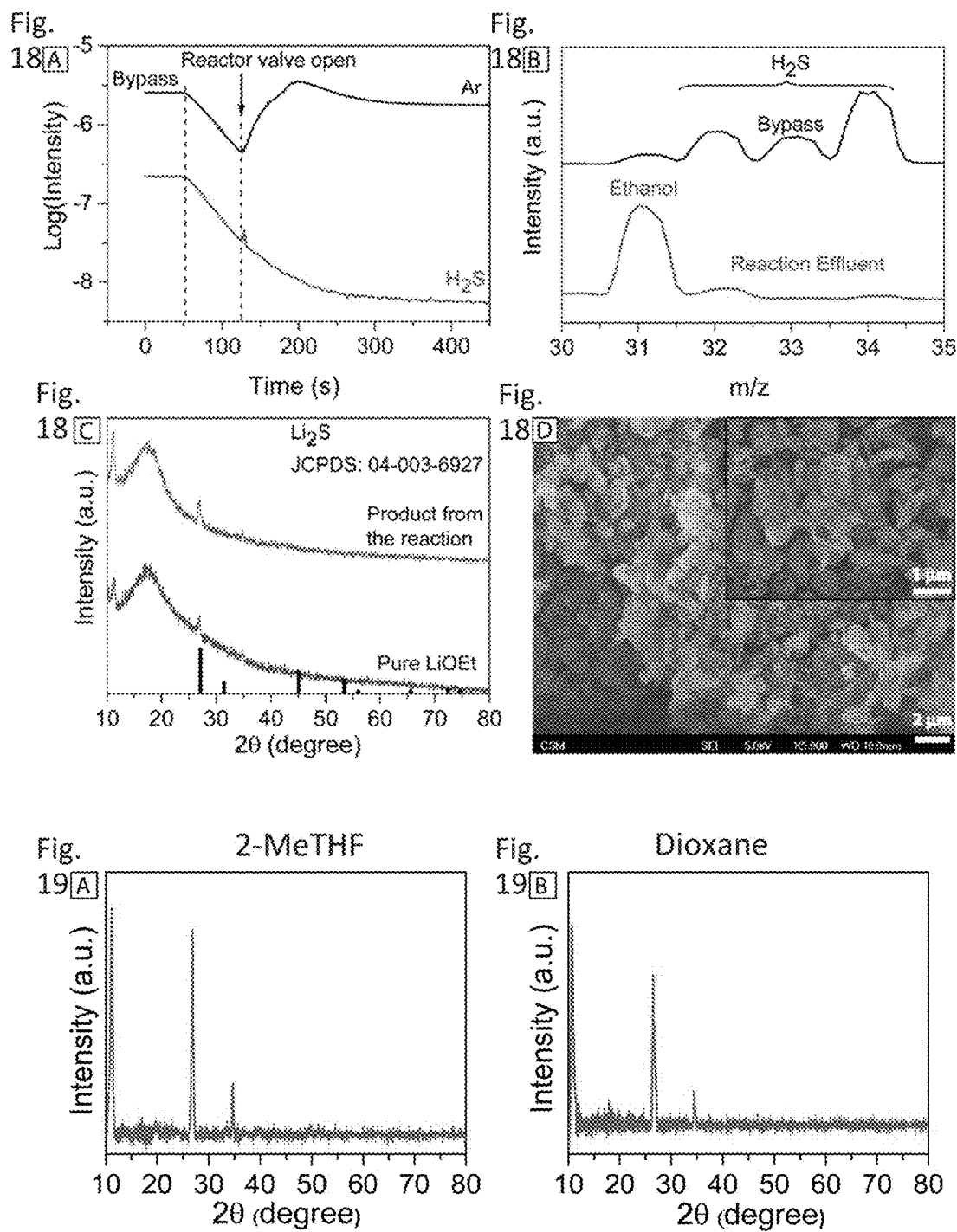

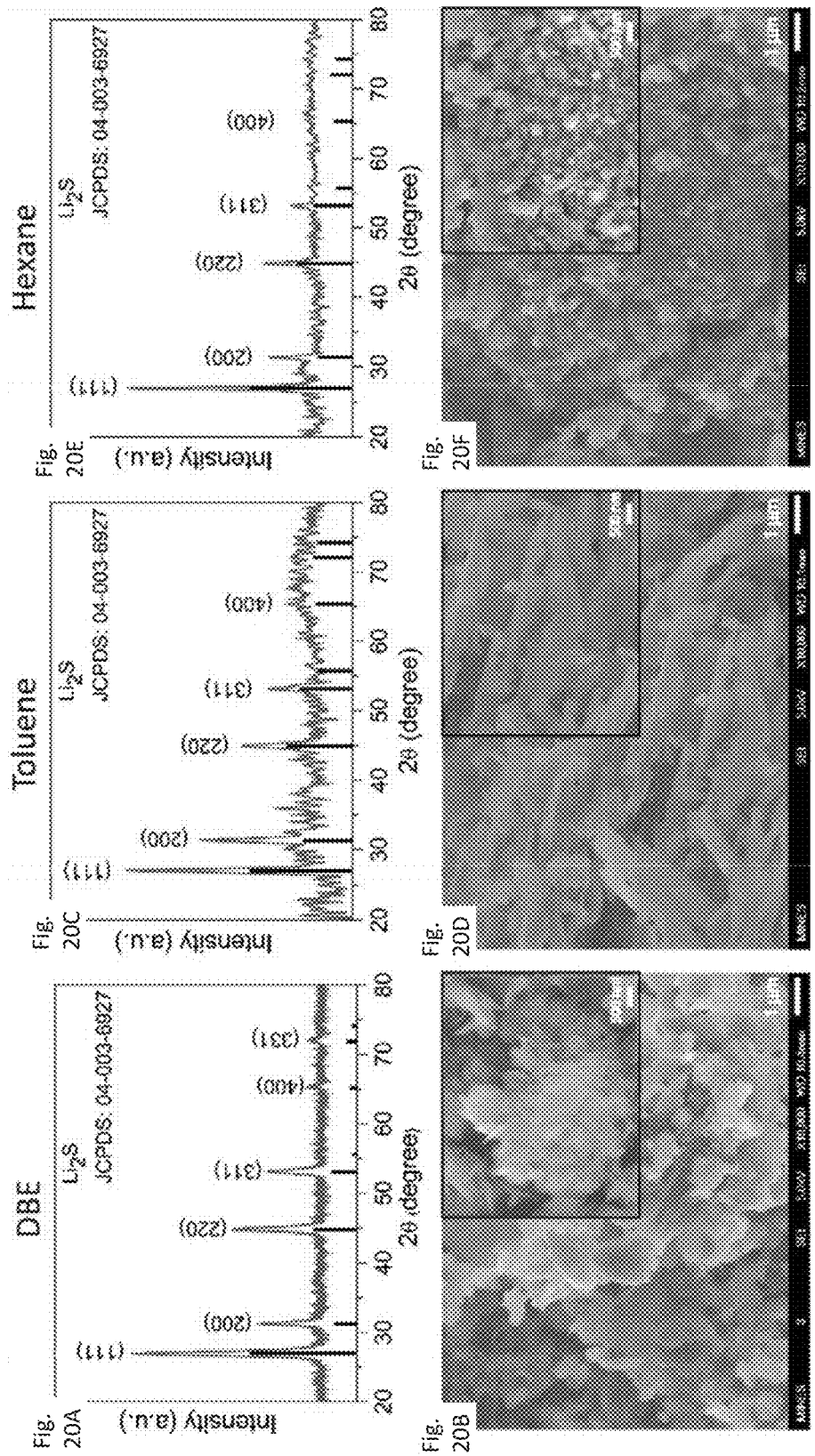

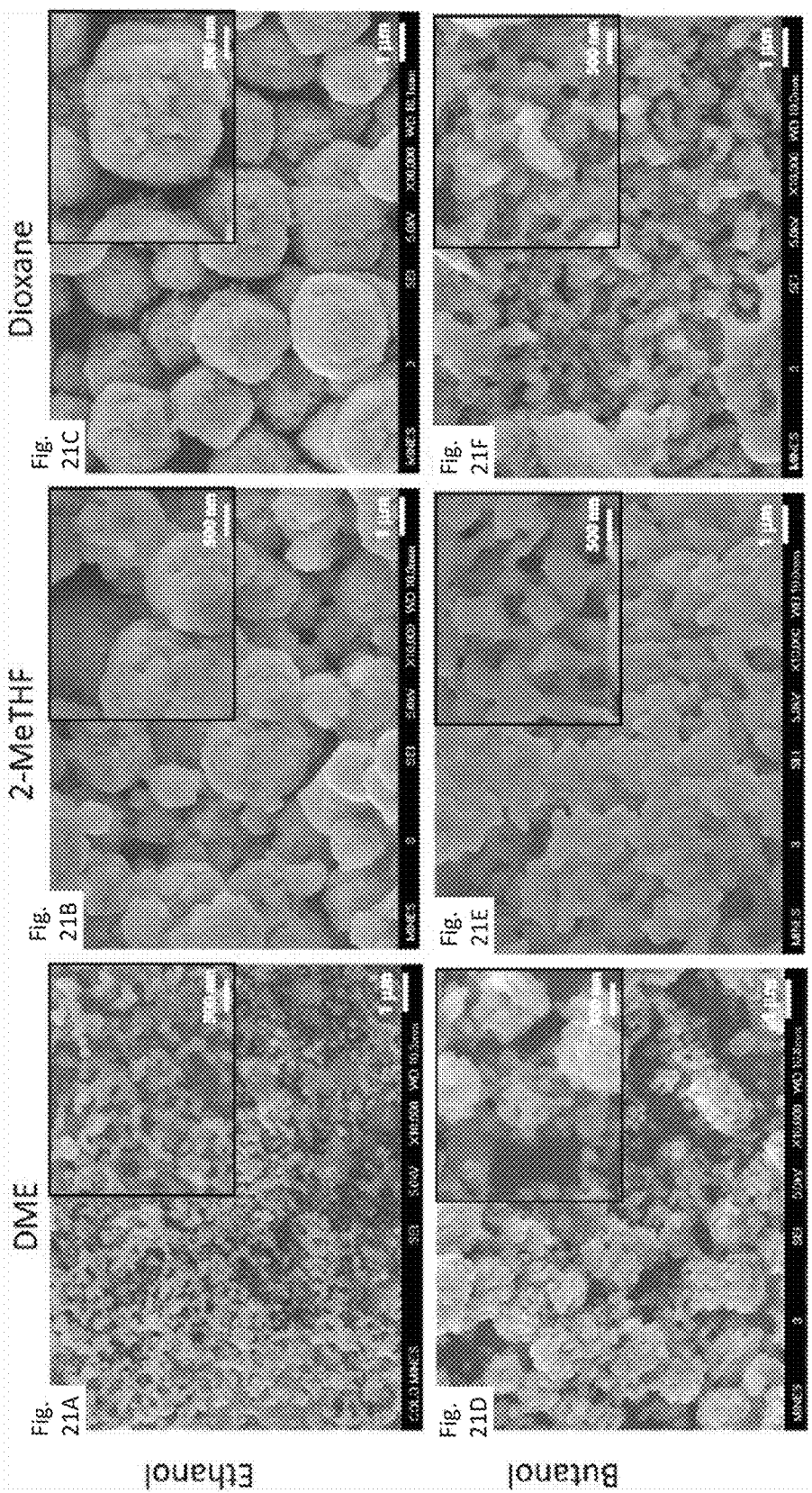

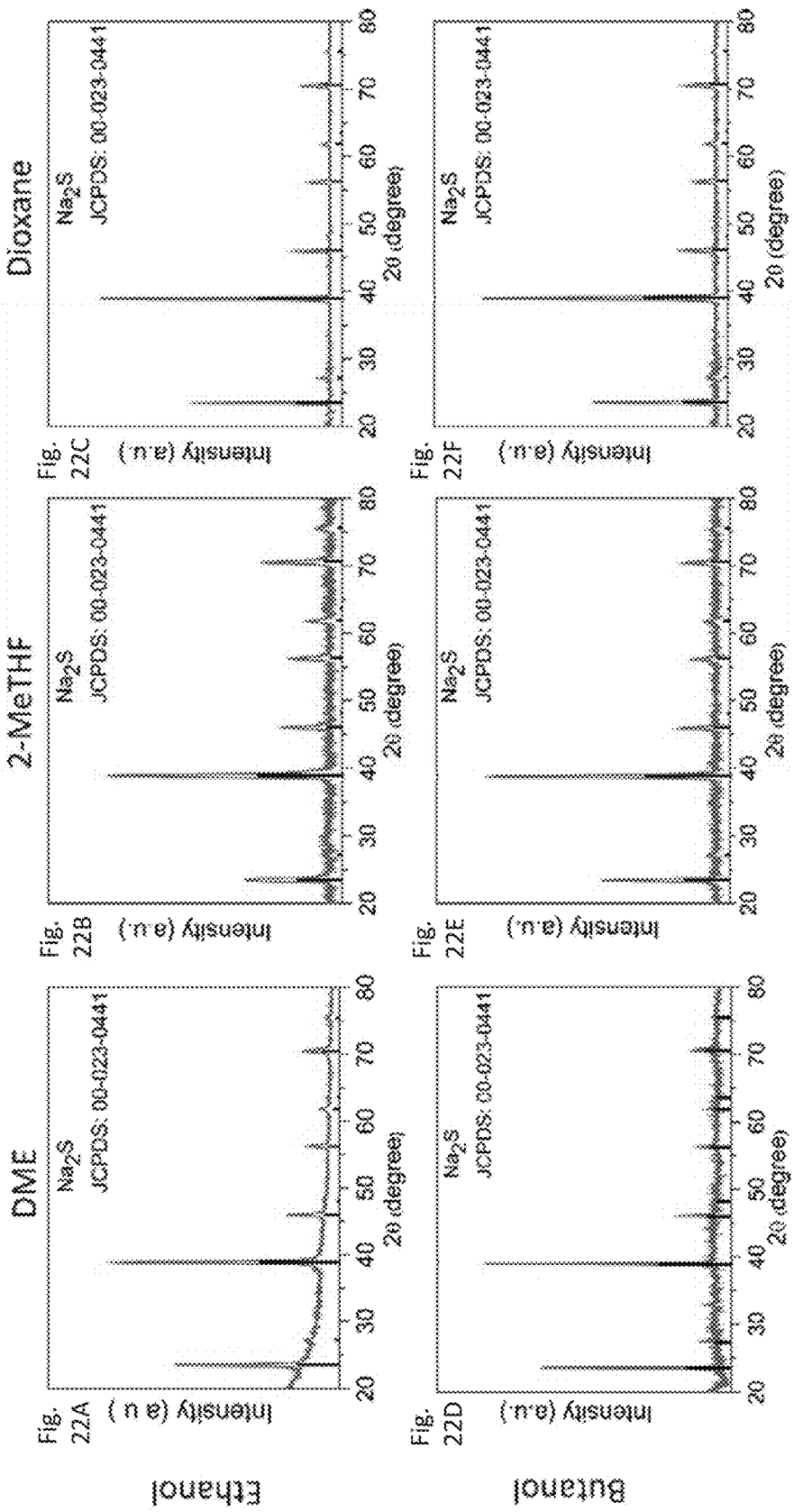

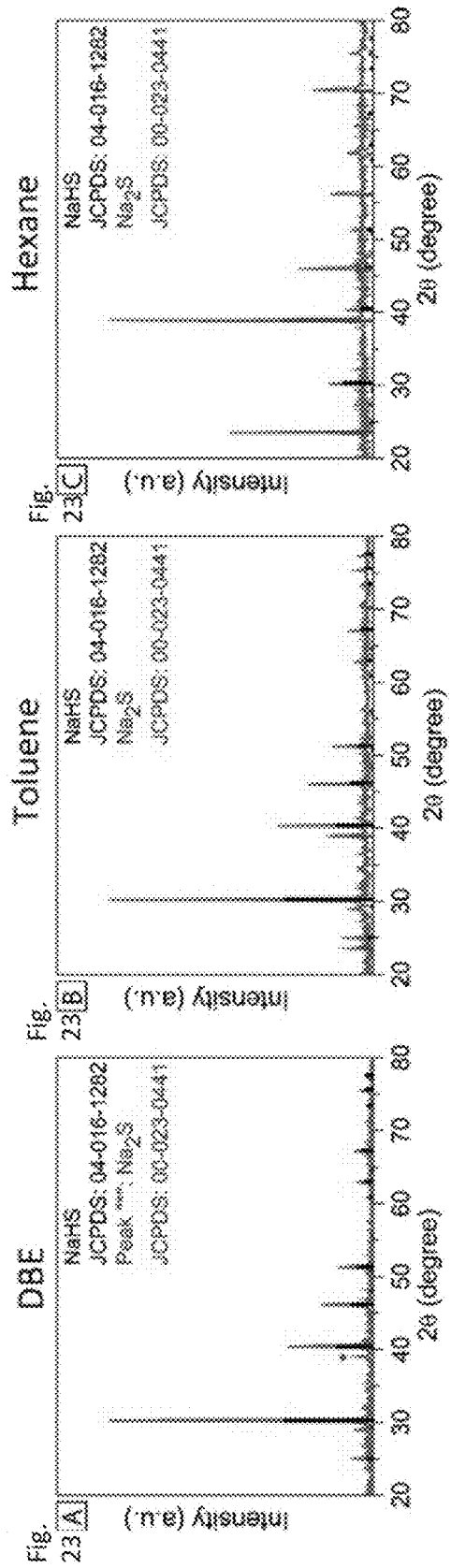

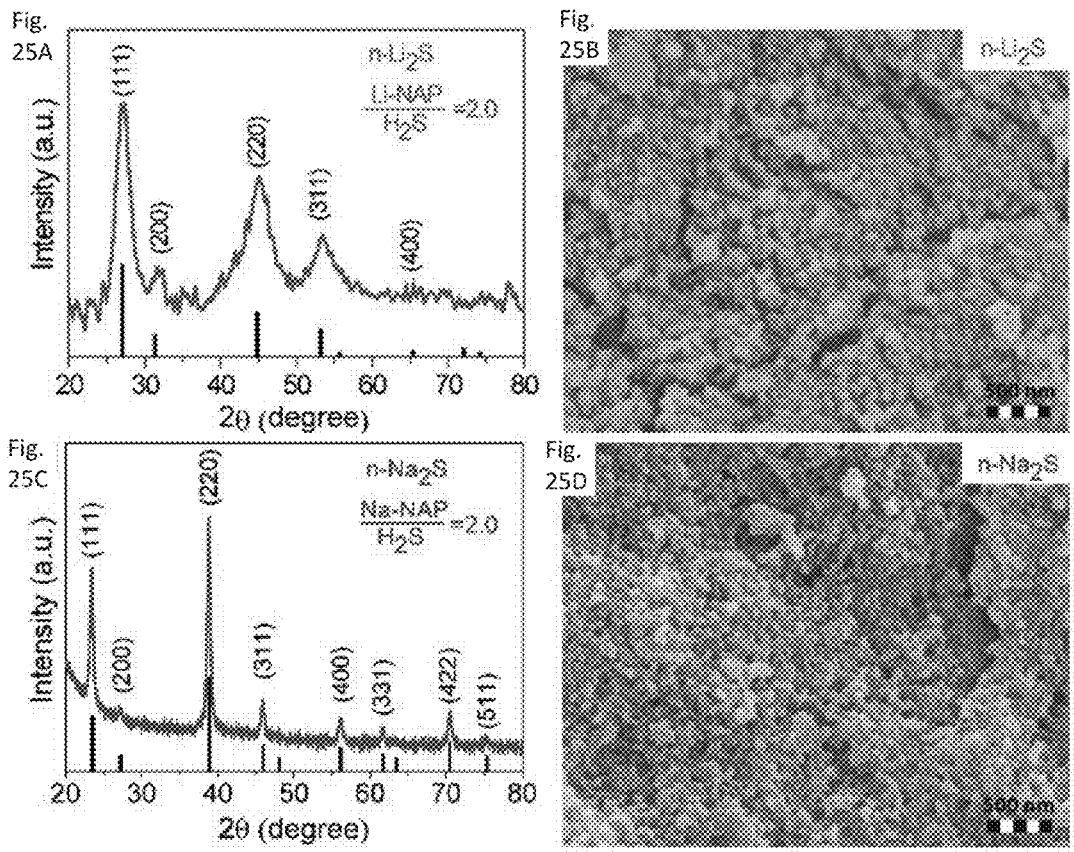
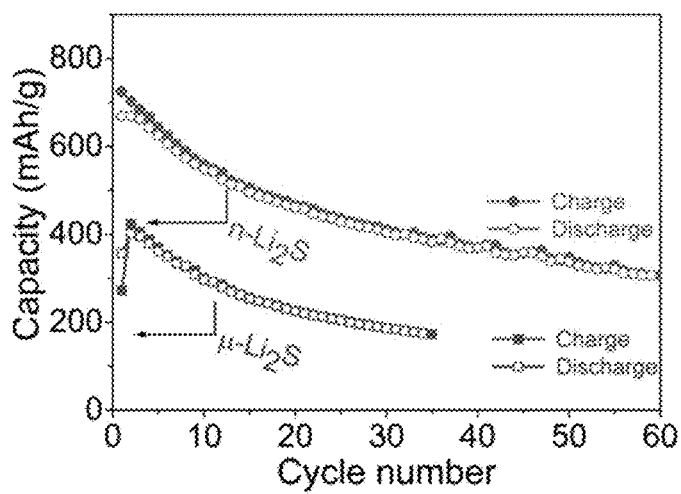
Fig. 26

PRODUCTION OF ALKALI SULFIDE CATHODE MATERIAL AND METHODS FOR PROCESSING HYDROGEN SULFIDE

CROSS-REFERENCE TO RELATED APPLICATIONS

This application claims benefit of priority pursuant to 35 U.S.C. § 119(e) of U.S. provisional patent application No. 62/280,531 filed on Jan. 19, 2016, which is hereby incorporated by reference in its entirety.

FIELD

The disclosed processes, methods, and systems are directed to materials for rechargeable batteries and methods of making the materials and using the materials in to fabricate batteries.

BACKGROUND

Solar and wind generation of electricity are commercialized and growing steadily, with new installations for exceeding 50 GW/year. Efficient technologies for storage and deployment are required to adapt the temporal nature of these sources to match consumption and ensure their continued expansion. In addition, meeting the increasing demands of advanced consumer electronics and electric vehicles requires next generation rechargeable batteries with greater specific-energy and energy density than current lithium (Li) ion batteries (LIBs). Lithium ion batteries (LIBs) are a well-developed energy storage media, but they are approaching intrinsic performance limits and cannot meet the demands required for electric vehicles (EVs), advanced consumer electronics, and stationary storage.

Leading candidates to supplant LIBs include solid state batteries and those based on the lithium-sulfur (Li—S) redox pair. Solid state batteries employ conventional electrode materials (i.e. graphite/$LiCoO_2$), but may achieve 2-3 times higher energy density than LIBs by replacing the volatile and flammable liquid electrolyte with a solid electrolyte (SE), making them competitive with Li-air batteries. Sulfide ceramics derived from lithium sulfide ($Li_2S$) are the leading SE materials owing to their high conductivity and superior ductility, with leading candidates based on the $Li_2S$—$P_2S_5$ and $Li_2S$—$GeS_2$ systems.

Li—S batteries are particularly attractive for EV applications, due to their high practical specific energy, long driving distance, and low pack prices. Room temperature Na—S (sodium-sulfur) batteries, which have similar working principle as Li—S batteries, are also highly attractive for stationary storage due to the abundance and low cost of Na. The simplest configuration for M-S batteries employs a M (M=Li and Na) anode and S cathode, but the use of alkali metal sulfide ($M_2S$, M=Li and Na) cathodes present several advantages. First, $M_2S$ cathodes can be paired with metal-free anodes, such as existing anodes (graphite) or emerging materials (Si and Sn). For example, the practical specific energy of Si—$Li_2S$ (930 Wh/kg) is close to that of Li—S batteries (1000 Wh/kg). Second, $M_2S$ cathodes are fully lithiated, not requiring preset void space around $M_2S$ particles for accommodating the detrimental volume fluctuations that occur during charging/discharging cycles. Third, the electrode fabrication is simplified due to the greater thermal stability of $M_2S$, and it allows batteries to be assembled in the discharged state, a safer and more cost-effective process. Emerging solid state battery architectures incorporate $M_2S$ into all three components: cathode, anode and electrolyte, demonstrating the great importance of $M_2S$ for solid state batteries.

$M_2S$ is commercially produced by carbothermal reduction processes. The high temperatures employed in these processes yield $M_2S$ in the form of micropowders, and impurities are a major concern. Additionally, $Na_2S$ is mainly commercially available in its hydrate form ($Na_2S \cdot xH_2O$, x~3) and contains polysulfide impurities. At present, there are no domestic suppliers, putting significant constraints on battery manufacturers that would like to integrate $M_2S$ into their products. In addition, $M_2S$ micropowders confront some shared challenges with conventional Li—S technology. First, $M_2S$ in the bulk form is a very poor electronic and ionic conductor, requiring the use of large overpotentials to initiate cycling. Second, charging/discharging proceeds through polysulfide intermediates ($M_2S_n$, n=4-8) which have high solubility in conventional electrolyte solutions and migrate between the cathode and the anode. This can lead to a serious loss of active material and anode corrosion.

To address these issues the scientific community has invested significant effort in recent years to develop nanoparticle (NP)-based cathodes. Compared with bulk materials, the high specific surface area of NPs enables higher cycling stability, specific capacity, and rate capability. In addition, the high activation potential required for bulk materials is not needed for NPs. Nanostructure is also important for $M_2S$-based solid electrolytes. The fabrication of the electrolyte ceramics involves mixing and annealing (200-600° C.) the constituent powders ($M_2S$, $P_2S_5$, and $GeS_2$).

The most common strategy for the $M_2S$—NP synthesis is to convert commercial $M_2S$ micro-powders into $M_2S$—NPs through high energy ball milling, which is time consuming and can introduce impurities. Other methods demonstrated in academia include recrystallization of dissolved $M_2S$, electrochemical lithiation/sodiation of sulfur NPs, or carbothermal reduction using molecular precursors. The challenges for all of these approaches are that they are energy intensive, time consuming, and not amenable to scale-up. In addition, they are limited with respect to their level of control over size, uniformity, or morphology.

Disclosed herein are methods and systems for producing $M_2S$ nanoparticles and hierarchical structures comprising the nanoparticles ($M_2S$—HSs). The disclosed nanoparticles, methods, and systems solve many of problem associated with existing technologies, and do so in efficient and economical ways. Regarding synthesis of $M_2S$—HSs, the disclosed method may comprise two steps: synthesis of $M_2S$ secondary clusters ($M_2S$ SCs) and carbon coating the SCs. The former is a chemical reaction between a sulfur-containing inorganic compound and an alkali metal organic compound in an organic solution. The reaction directly generates the wanted $M_2S$—SCs powder, which can be collected as a precipitate from the reaction solution. The latter is to integrate a carbon-scaffold with $M_2S$ SCs by carbonizing a double-shell polymer coating

SUMMARY

Disclosed herein are methods for the efficient synthesis of anhydrous alkali sulfide ($M_2S$, where M may be, but is not limited to Li and Na) nanocrystals (NCs) through the reaction of alkali metals with hydrogen sulfide ($H_2S$). In many embodiments, the alkali metal is first complexed with an alcohol (in one embodiment ethanol) in a solution, forming a metal alkoxide and releasing hydrogen ($H_2$). In most embodiments, a second step involves bubbling $H_2S$ through the solution. This may result in the complete consumption of the $H_2S$, reactive precipitation of $M_2S$ NCs, and regeneration of the alcohol. The disclosed steps are thermodynamically very favorable ($\Delta Gmo<-100$ kJ/mol), proceeding rapidly to completion with near 100% atom efficiency at ambient temperature. In most cases, the net result, $H_2S+2M \rightarrow M_2S+H_2$, is the consumption of a hazardous industrial waste, $H_2S$, and production of two value-added products, $M_2S$ and $H_2$. In addition, the two products are readily phase-separated from the organic solution, which may then be recycled. The purity, morphology, and homogeneity of the resulting $M_2S$ nanopowders can be confirmed by X-ray diffraction and scanning electron microscopy. In many embodiments, the choice of the organic reagent and of the solvent may enable the $M_2S$ morphology to be tuned between individual NCs and secondary clusters. Tunability may be beneficial for use of these materials in advanced rechargeable batteries.

The chemistry underlying the described methods and processes for the scalable manufacturing of $M_2S$ nanostructures is shown in Scheme 1. Anhydrous, phase pure $M_2S$—NPs are generated through the reaction between $H_2S$ and a metal (in most embodiments, an alkali metal) introduced in the form of metalorganic complexes (R-M) dissolved in solutions. This reaction is thermodynamically favorable, and it proceeds to completion instantly and irreversibly at ambient temperature. In one embodiment, valuable $H_2$ can be recovered during the regeneration of R-M complex, realizing the net reaction of $H_2S+2M \rightarrow M_2S+H_2$.

Scheme 1: Proposed chemical pathway for the efficient and sustainable $M_2S$ manufacturing.

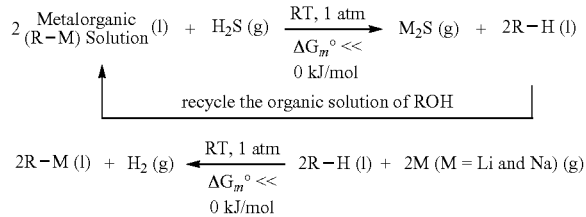

BRIEF DESCRIPTION OF THE DRAWINGS

FIG. 3A-3D is a schematic illustration of representative $M_2S$—NCs@C structures. (3A) zero order hierarchy, (3B) first order hierarchy; (3C) second order hierarchy; and (3D) a performance comparison of several $Li_2S$—NCs@C cathodes in reference to highlight the superiority of $M_2S$—NCs@C HSs.

FIG. 8 is a schematic illustration of one embodiment of the disclosed methods and processes for producing $M_2S$—NCs@C HSs.

FIG. 9A-9B show (9A) mass spectra in the M/Z window of 0-50 for the gaseous effluent through the reactor containing Na and ethanol in dimethoxyethane (DME), and (9B) integrated volume of $H_2$ based on its temporal flowrate measured by online QMS (inset).

FIG. 10A-10D various forms of characterization for one embodiment of the disclosed synthetic method: 10A, Mass spectra in the M/Z window of 30-35 for the gaseous effluents through the bypass (black) and the reactor (red); 10B, Time evolution of QMS to monitor the concentrations of H2S (red) and the carrier gas Ar (black); 10C, XRD data of the synthesized Na2S—NCs by using sodium; 10D, scanning electron microscope picture.

FIG. 12A-C shows in-situ TEM study of a single sulfur particle under battery operation: 12A, is a schematic of the Li—S cell setup; 12B, TEM images of the Li—S cell during discharge (1-60 s); 12C, SAED patterns of the sulfur area and the new layer.

FIG. 13A-F shows a schematic diagram of one embodiment of a reaction apparatus for use with the disclosed methods and processes and analysis thereof: 13A, using the model reaction of NaOEt in EtOH/DME with H2S for synthesizing Na2S nanocrystals (B-F); 13B, time evolution of QMS of key species in the gas phase-Ar (black) and H2S (red); 13C, mass spectra in the m/z window of 30-35 for the gaseous effluents through the bypass (black) and through the reactor (red); 13D, XRD pattern of the obtained solid product (red) with the standard Na2S pattern (black, JCPDS 00-023-0441); 13E, SEM images of the obtained solid product, with higher magnification as inset; 13F, EDX spectrum and atomic percent of elements in the obtained solid product.

FIG. 14A-14B shows: 14A, $H_2$ calibration curve of $H_2$ flowrate versus QMS intensity ratio of $H_2$/Ar (AMU2/AMU40); and 14B, real time QMS intensity ratio of $H_2$/Ar in the reactor.

FIG. 15A-15B (15A) TGA result for commercial $Na_2S \cdot 9H_2O$ (black) and two annealed $Na_2S$ samples (red for s-$Na_2S$, blue for c-$Na_2S$); (15B) XRD patterns of the annealed $Na_2S$ powders (red for s-$Na_2S$, blue for c-$Na_2S$), with the $Na_2S$ standard pattern (black, JCPDS 00-023-0441).

FIG. 16A-B shows hydrogen production and quantification from the reaction of Na with EtOH: 16A, Mass spectrum of the gaseous effluents in the reactor to show the production of hydrogen; 16B, Hydrogen quantification based on the integration of H2 flowrate with respect to time, and the inset is the H2 flowrate versus time derived from the real time QMS ratio of $H_2$/Ar and the calibration curve (FIG. 14).

FIG. 17A-17F shows characterizations for the recycling of EtOH/DME solution. The $^1$H NMR spectra of 17A, EtOH/DME solution, 17B, NaOEt-EtOH/DME solution, and 17C, supernatant collected from the synthetic reaction. The insets in 17A, 17B, and 17C highlight the $^1$H peaks contributed from —$CH_3$ group in EtOH. Supernatant collected from the synthetic reaction was used to react with Na and then $H_2S$ in the next round of $Na_2S$ synthesis; 17D, is time evolution of QMS of key species in the gas phase: Ar (black), and $H_2S$ (red); 17E, Mass spectra in the m/z window of 30-35 for the gaseous effluents through the bypass (black) and through the reactor (red); 17F, XRD pattern of the obtained solid product (red) with the standard $Na_2S$ pattern (black, JCPDS 00-023-0441).

FIG. 18A-18D shows characterizations for the reaction of $H_2S$ with LiOEt-EtOH/DME: 18A, Time evolution of QMS for Ar (black) and $H_2S$ (red); 18B, Mass spectra in the m/z window of 30-35 for the gaseous effluents through the bypass (black) and the reactor (red); 18C, XRD patterns of the obtained solid product (red) from the reaction and synthesized LiOEt powder (blue) with the standard pattern of $Li_2S$ (black, JCPDS: 04-003-6927); 18D, SEM images of the obtained solid products.

FIGS. 19A and 19B shows XRD results of the produced solid powders from the reactions of H2S with lithium ethoxide in 2-MeTHF (19A), or dioxane (19B).

FIG. 20A-20F are XRD (upper) patterns (red) with the standard patterns of $Li_2S$ (black, JCPDS: 04-003-6927) and SEM images (below) of $Li_2S$ products from the reaction of $H_2S$ with LiOEt in EtOH/DBE (20A-20B) EtOH/toluene (20C-20D), and in EtOH/hexane (20E-20F).

FIG. 21A-21F demonstrates $Na_2S$ morphology tuning by changing alcohols and solvents. SEM images of the obtained solid products from the reactions of $H_2S$ with sodium ethoxide (21A-21C) or sodium butoxide (21D-21F) in the solvents of DME (21A and 21D), 2-MeTHF (21B and 21E) or dioxane (21C and 21F).

FIG. 22A-22F are XRD results of the synthesized $Na_2S$ from the reactions of $H_2S$ with sodium ethoxide (22A-22C) or sodium butoxide (22D-22F) in the solvents of DME (22A and 22D), 2-MeTHF (22B and 22E) or dioxane (22C and 22F).

FIG. 23A-23C XRD results of the solid products from the reactions of $H_2S$ with sodium ethoxide in DBE (23A), toluene (23B) or hexane (23C).

FIG. 24A-22D are XRD patterns (red) with the standard $Na_2S$ pattern (black, JCPDS 00-023-0441) and SEM images of the obtained solid products from the reactions of $H_2S$ with NaOEt in solvents of toluene (24A-24B), or hexane (24C-24D).

FIG. 25A-25D shows XRD and SEM characterization of $Li_2S$ (A, B) and $Na_2S$ (C, D) NPs derived using naphthalene as the complexing reagent and 1,2-dimethoxyethane (DME) as the solvent.

FIG. 26 shows cycling stability of cathodes fabricated with our $Li_2S$ NPs (n-$Li_2S$) versus commercial micropowders (μ-$Li_2S$).

DETAILED DESCRIPTION

Currently, the most advanced rechargeable batteries are lithium ion batteries (LIBs). The anode is solely graphite and the cathode mainly employs lithium metal oxides. The interlayer space in these materials enables them to experience little volume fluctuations (~10%) during the charging/discharging cycles, providing LIBs with relatively high energy-density and great cyclability. However, emerging demands for advanced consumer electronics, electric vehicles (EVs), and stationary facilities call for the next generation of rechargeable batteries with higher specific energy (energy per mass) and energy density (energy per volume).

Figure 1:
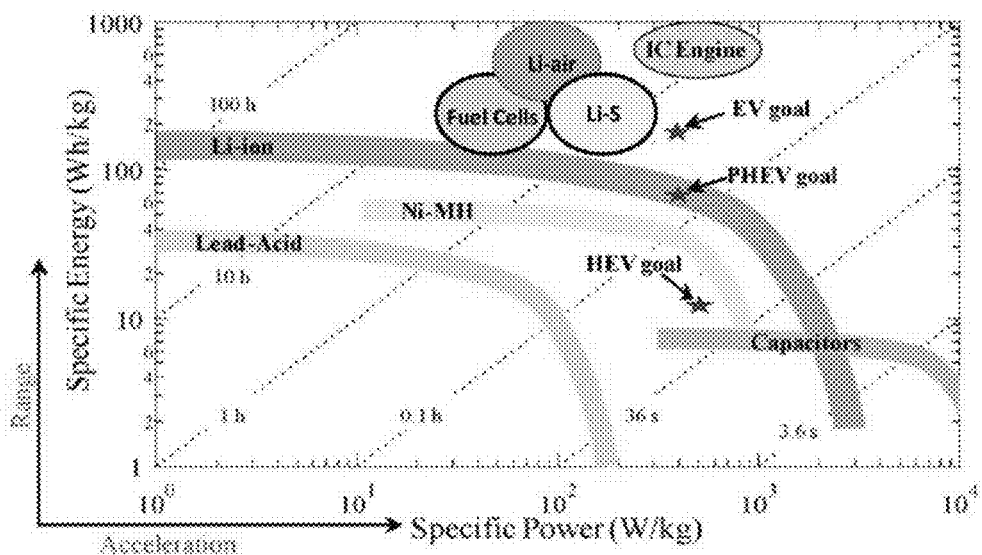
FIG. 1 is a Ragone plot of various electrochemical energy storage and conversion devices, copied from reference.
Figure 2A:
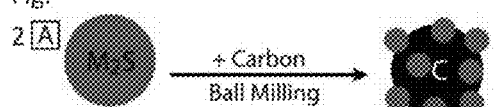
FIG. 2A-2D is a diagram of four major methods for making M2S—NCs/carbon composite cathodes. (2A) Ball milling commercial $M_2S$ micropowders and a carbon material; (2B) recrystallization of $M_2S$ in the presence of a carbon material or a polymer (a subsequent carbonization is needed); (2C) lithiation/sodiation of S nanocrystals with metal reactants; and (2D) thermal reduction of metal sulfates with carbon precursors.
Figure 2B:
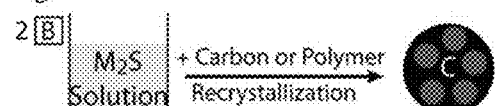
Figure 2C:
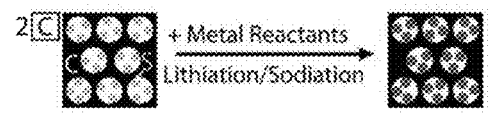
Figure 2D:
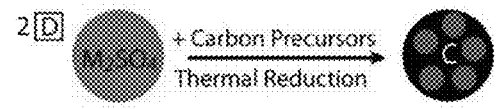

Alkali metal sulfide cathodes ($M_2S$, where M=Li and Na) have great promise for several technologies beyond LIBs, such as metal-sulfur, graphite-sulfur, and silicon-sulfur batteries. It is forecast that the market for $M_2S$-based batteries will expand to $6 billion in 2030 and explode to $29 billion in 2035. Li—S batteries are particularly attractive, as shown in FIG. 1. Compared with the current generation of LIBs, Li—S batteries hold two notable advantages: A) they offer higher specific energy (2600 vs 580 Wh/kg) and higher energy density (2200 vs 1800 Wh/L); B) they employ an earth abundant and cost-effective element (sulfur) in the cathode. As a result, Li—S batteries are superior to LIBs with respect to practical specific energy, specific power, and costs. Na—S batteries are appealing for stationary facilities because Na is more abundant and much cheaper than Li. However, as reported by many studies, the direct use of alkali metal anodes and sulfur cathodes results in a problem: cycling can lead to the formation of harmful dendrites on the metal anodes, which may penetrate the separator, potentially causing short-circuit, thermal runaway, and even fire. In addition, the poor mechanical strength of M electrodes makes the battery assembly challenging. An alternative approach is to use $M_2S$ as the cathode.

Importance of Metal Sulfide Cathodes

Rechargeable batteries based on $M_2S$ cathodes present several advantages. First, $M_2S$ cathodes can be paired with metal-free anodes, such as the existing anode (graphite) or newly-emerging materials (Si and Sn). The practical specific energy of Si—$Li_2S$ batteries (930 Wh/kg) is close to that of Li—S batteries (1000 Wh/kg). Second, due to their greater thermal stability, $M_2S$ compounds (melting points above 900° C.) permit a wider temperature window for electrode fabrication. Third, $M_2S$ cathodes are fully lithiated/sodiated, not requiring preset void space around $M_2S$ particles for accommodating the detrimental volume fluctuations that occur during the charging/discharging cycles. Fourth, although a dry room or glovebox is required for electrode fabrication, $M_2S$ cathodes allow for batteries to be assembled in the "discharged" state, a safer and more cost-effective process.

Despite these advantages, $M_2S$ and S cathodes confront a similar challenge, that is, their performance degrades seriously with cycling due to several problems. They both are poor electronic and ionic conductors, showing complicated and sluggish electrochemical processes. During the charging/discharging cycles they experience equal amplitude of volume fluctuation (80-160%), which can pulverize the electrode and damage the electrical contact. Their common intermediates—polysulfides ($M_2S_n$, n=3-8) have high solubility in typical electrolyte solutions and migrate repeatedly between the cathode and the anode. This can cause a loss of the active material and corrode the anode. To mitigate these problems, researchers have developed many protective approaches, such as confining $M_2S$ (or S) nanocrystals (NCs) in a conductive matrix.

NCs, compared with bulk materials, enable higher cycling stability, specific capacity, and rate capability, due to their superior mechanical resilience, greater M-ions' accessibility, and faster diffusion kinetics. In addition, the high activation potential required for bulk $M_2S$ is not required for $M_2S$—NCs. The most widely used conductive matrix is carbon due to its suitable electrical conductivity, thermal stability, chemical stability, density, and cost. Thus, in the past years enormous efforts have been attracted to develop $M_2S$—NCs/carbon composite cathodes.

Four major methods for making $M_2S$—NCs/carbon composite cathodes are illustrated in FIGS. 2A-2D. First, commercial $M_2S$ micropowder is ball milled together with a carbon material to either imbed $M_2S$—NCs inside the carbon matrix or tether them to the carbon surfaces (2A). Second, commercial $M_2S$ the dissolved and recrystallized in the presence of a carbon material or a polymer (2B). In the latter case, there is a subsequent step to carbonize the polymer at elevated temperatures. The resulting $M_2S$—NCs are encapsulated inside the carbon matrix. Third, premade S—NCs in porous carbon are lithiated/sodiated by metal reactants (2C). Fourth, metal sulfates are thermally reduced with molecular carbon precursors (2D) to produce carbon matrix-protected $M_2S$—NCs. While the $M_2S$—NCs/carbon electrodes produced by these methods offer superior performance compared with commercial $M_2S$ micropowder-based electrodes, they still cannot fully mitigate the problems listed above for practical applications. More advanced structures are needed.

Presently, $M_2S$ is available only as micropowder, reflecting high temperature fabrication processes, described by reactions 1-2, below.

1)

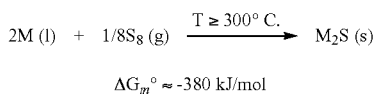

$\Delta G_m^\circ \approx -380$ kJ/mol

2)

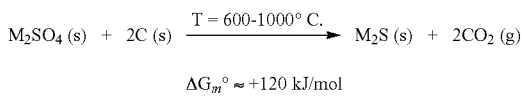

$\Delta G_m^\circ \approx +120$ kJ/mol where l, g, and s denote liquid phase, gas phase, and solid phase, respectively. Because M and S both are very reactive at elevated temperatures, the operation of reaction 1 is challenging, although it is thermodynamically favorable. An alternative way of running reaction 1 is to dissolve M in liquid $NH_3$ at $<-33°$ C., but this approach brings additional complications. Reaction 2 is an endothermic carbothermal reduction that requires high temperatures and produces the problematic greenhouse gas. Thus, for battery applications that favor $M_2S$—NCs, new synthetic methods are needed.

Hierarchical Structures

FIGS. 3A-3D is a conceptual overview of some embodiments of disclosed $M_2S$—NCs@C hierarchical structures (HSs). In the simplest case of zero order hierarchy (FIG. 3A), HSs are individual core@shell particles. They are vulnerable to the volume-fluctuation-induced mechanical force during the charging/discharging cycles. The electrode would fade quickly once the carbon shell is broken. However, overbuilding the shell thickness is not desired because it would increase the transport resistance of $M^+$ ions and decrease the specific energy as well as the energy density. In the case of first order hierarchy (FIG. 3B), multiple $M_2S$—NCs are distributed inside a carbon matrix. Consequently, the mechanical failure is significantly suppressed. When two orders of hierarchies are achieved (FIG. 3C), by coating the first order hierarchy with an outer carbon shell, the electrode performance is greatly approved. Typically, in the battery community only structures of two or more orders of hierarchies are called HSs. FIG. 3D shows a performance comparison of several $Li_2S$—NCs@C cathodes, reported by Yushin et al (Wu, F., et al. "A Hierarchical Particle-Shell Architecture for Long-Term Cycle Stability of Li2S Cathodes", Advanced Materials, 2015, 27, 5579-5586.). Evidently, the $Li_2S$—NCs@C HSs (schematically like the cartoon in FIG. 3C) are much superior to those non-HS electrodes. Even after 600 cycles at the rate of C/2, the specific capacity is still above 1000 mAh/g, 72% of the theoretical value. While this is the only report known testing $M_2S$—NC@C HSs, the excellent performance and advantages realized when using HSs have also been demonstrated on other electrode materials such as silicon (Si) and sulfur (S).

The existing method for synthesis of $Li_2S$—NCs@C HSs is as follows. First, the commercial $Li_2S$ micropowder and polyvinylpyrrolidone (PVP) are dissolved in ethanol. Then, ethanol is evaporated to obtain a $Li_2S$—NCs@PVP composite. After that, the composite is heated under argon (Ar) to carbonize PVP, producing a $Li_2S$—NCs@C composite. Last, an outer carbon shell is deposited by chemical vapor deposition (CVD) to produce the wanted $Li_2S$—NCs@C HSs. However, scale-up of this process for industrial applications will confront two challenges: A) the need to dissolve commercial $Li_2S$ micropowder and then recrystallize it into NCs makes the overall electrode-fabrication process energy-intensive and cost-ineffective; and B) the carbon-producing yield from PVP is low, about 12%. Thus, synthetic methods that are more practical are needed.

Applicant's $M_2S$ NP/NC Synthesis

Disclosed herein are processes, methods, and systems for synthesizing $M_2S$ nanoparticles and hydrogen gas, $H_2$, from dangerous $H_2S$ and a metal. The disclosed method can be run continuously due to the ready separation and isolation of the hydrogen gas and the $M_2S$ particles. In many embodiments, this process can be further modified to produce secondary clusters of the $M_2S$ particles for use in hierarchical structures.

The disclosed processes are based on the tenets of green chemistry and engineering. Alkali metal is the critical element and cost driver in any advanced battery technology, and must be used efficiently. This is a green chemistry in the sense that it proceeds with an atom economy approaching 100%, meaning that the M and $H_2S$ supplied are completely converted into $M_2S$ and $H_2$. $H_2S$ is a dangerous pollutant and health hazard that represents a major liability for many industries, including oil and gas production. The disclosed process, in most embodiments, results in complete $H_2S$ abatement, and may be part of a comprehensive solution to this addressing this industrial waste. Another green principle is that the process is designed to aid in separating the products. Specifically, the solid ($M_2S$) and vapor-phase ($H_2$) products are readily separated from the solution which is then recycled/regenerated. Lastly, this process requires little or no thermal energy input, and in most embodiments can proceed at room or ambient temperature.

The combination of hazardous waste removal ($H_2S$), co-generation of valuable byproducts ($H_2$) and the absence of significant energy requirements suggests that, at scale, this process should be able to generate $M_2S$ NPs without significant additional costs beyond that of the metal reagent.

NP synthesis

Various steps may be required for creating the disclosed nanoparticles. In one embodiment, the disclosed process for NP synthesis may involve two steps. For example, in this embodiment $M_2S$ NP synthesis and $H_2S$ abatement may be accomplished in one step (the first step), but $H_2$ recovery and reagent regeneration occur in the second step, as shown below in reactions 2-3. Reaction 4 shows the overall reaction.

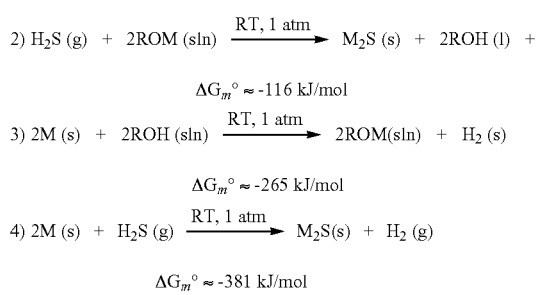

As depicted above, in the first step (rxn 2) of this embodiment, $M_2S$ nanocrystals precipitate from the reaction of $H_2S$ with a metal alkoxide precursor, regenerating the alcohol reagent. After removing the NPs (in some embodiments by centrifugation), the solution is reacted with fresh alkali metal to regenerate the metal alkoxide precursor and release $H_2$ (rxn 3). In some embodiments, $Na_2S$ is precipitated from NaOEt in EtOH/DME. In many embodiments, the disclosed process can be varied to alter and tune the morphology of the resulting nanoparticles. In some embodiments, the morphology of the nanoparticles may be altered by appropriate selection of various alcohol and/or solvent combinations.

Metals

Various metals can be used in combination with the disclosed methods and systems. In many embodiments, the metal is an alkali metal or transition metal. In many embodiments, the metal may be selected from sodium, lithium, potassium, rubidium, cesium, francium, chromium, manganese, iron, copper, nickel, cobalt, and zinc. In some embodiments, the metal is sodium, Na, or lithium, Li. In some embodiments, sodium may be appealing for use with the disclosed methods and systems due to its abundance and low cost relative to Li, for example in stationary electrical-storage applications. $Na_2S$ is a major commodity chemical, produced annually at a rate of ~150 thousand tons/year for diverse applications including chemical manufacturing, paper production, and tanning. It is commercially available in its hydrate form ($Na_2S \cdot xH_2O$, x~3) and contains polysulfide impurities. In some cases, the high purity, anhydrous $Na_2S$ produced by the disclosed processes and methods, may be used in applications other than batteries.

Complexing Reagent

An organic complexing reagent may be used to create a metalorganic solution to aid in reacting a metal with $H_2S$. In most embodiments, the complexing reagent, after reacting with $H_2S$ may capture hydrogen, which may be released thereafter to create hydrogen gas by reacting with the metal to reform the metalorganic reagent. In most embodiments the disclosed complexing agents are dissolved in a solution prior to reacting with $H_2S$. In some embodiments, the complexing agent may be selected from various organic compounds able to react with one or more of the disclosed metals.

The alcohols for use with the disclosed method have sufficient reactivity to efficiently form an alkoxide intermediate and also release $H_2$. In most embodiments, the $M_2S$ produced should have low or no solubility in the selected alcohol to aid in recovery of $M_2S$. In many embodiments, the alcohol can be selected from branched and straight chain alcohols ranging from ethanol (C2) to octanol (C8). In many embodiments, reactivity and $M_2S$ solubility may decrease with increasing molecular weight of the alcohol. In many embodiments, the alcohol is a straight-chain alcohol selected from ethanol and/or butanol.

Solvent

A solvent may be used to aid in maintaining the organometallic compound in solution. In many embodiments, the disclosed solvent may have a boiling point that is greater than about 60° C. and less than about 160° C. In some embodiments, the solvent is selected from Hexane, Toluene, dimethoxyethane (DME), dibutyl ether (DBE), and dimethylformamide (DMF). In many embodiments, the solvent may be selected for chemical compatibility with a specific ROM, $H_2S$, and/or $M_2S$. In some embodiments, the solvent may be selected based on various characteristics, for example boiling point, viscosity, surface tension, polarity, transport parameters, volatility, costs, ease of handling, etc. The solvent's viscosity ($\mu$) and/or surface tension ($\sigma$) may aid in tuning the crystal sizes—for example by affecting mass transport properties during reactions. In some embodiments, the solvent's boiling point (b.p.) may affect solvent removal.

Table 1 summarizes physical properties of some solvents for use in synthesizing $M_2S$-nanoparticles and nanocrystals.

TABLE 1

Properties of the solvents employed to date and the results in yielding $M_2S$-NCs.

| Solvent | Formula | $\mu$ (mPa · s) | $\sigma$ (mN/m) | b.p. (° C.) | $Na_2S$ | $Li_2S$ |
|---|---|---|---|---|---|---|
| DME | $C_4H_{10}O_2$ | 1.10 | 20 | 85 | ☺ | ? |
| DBE | $C_8H_{18}O$ | 0.74 | 23 | 142.4 | ? | ☺ |
| Hexane | $C_6H_{14}$ | 0.30 | 18.4 | 69 | ☺ | ☺ |
| Toluene | $C_7H_8$ | 0.59 | 28.9 | 111 | ☺ | ☺ |
| DMF | $C_3H_7NO$ | 0.92 | 37.1 | 152 | ☺ | ☺ |

DME = dimethoxyethane;
DBE = dibutyl ether; and
DMF = dimethylformamide.

In some embodiments, as discussed further below, the solvent may be selected based on its ability to dissolve a polymer. In some embodiments, the solvent may also able to dissolve the $M_2S$. Further, in many embodiments, the selected solvent may provide nucleation sites and may also assist the solvent in tuning $M_2S$—NCs size.

Polymer

In most embodiments, the selected polymer does not react with other reagents used in the disclosed methods, and has the ability to produce carbon under an inert atmosphere. In most embodiments, the disclosed polymer may produce carbon during pyrolysis in an inert environment. Pyrolysis is well known in the art and may involve high temperature decomposition of a carbon containing (organic) material in an environment lacking oxygen or other molecules (e.g. halogens) that may react with the carbon material. In some embodiments, the polymer may be selected from polyvinylpyrrolidone (PVP, $[C_6H_9NO]n$), poly(2-ethyl-2-oxazoline) (PEOZ, $[C_5H_9NO]n$), and polyacrylonitrile (PAN, $[C_3H_3N]n$). In most embodiments involving PVP or PEOZ, the solvent may be selected from DME, DBE, and DMF. In embodiments using PAN as a polymer, the solvent may be DMF. As mentioned before, the carbon-producing yield of PVP is about 12%, while its carbon-containing fraction is 64.8%. In stark contrast, the carbon-producing yield from PAN can be as high as 60%, very close to its carbon-containing fraction of 67.9%. The carbon-producing yield for PEOZ is unknown, but its carbon-containing fraction is 60.6%.

Reactor

Nanoparticle synthesis through reactive precipitation is typically based on mixing two liquid solutions to create supersaturation, and these systems are controlled by mixing at the microscale. As such, a number of innovative reactor designs have been used to extend the degree of control over these parameters including T-junctions, confined impinging jets, laminar microfluidic devices, and turbulent micromixers. In some cases, these techniques are not easily scaled or are not appropriate for use with the disclosed gas-liquid-solid chemistry. In some embodiments, batch or continuous stirred tank reactors may be used for precipitation process, but broad particle size distributions (PSD), due in part to the fast reactions.

Bubble columns may be used to react the H2S with metalorganic compounds. In many cases, bubble columns benefit from their simple construction and operation. Bubble columns can be run in continuous or semi-batch mode and scaled to various dimensions. In many embodiments, the bubble column may not contain sensitive mechanical devices such as stirrers.

System Methodology and Safety

Figure 4:
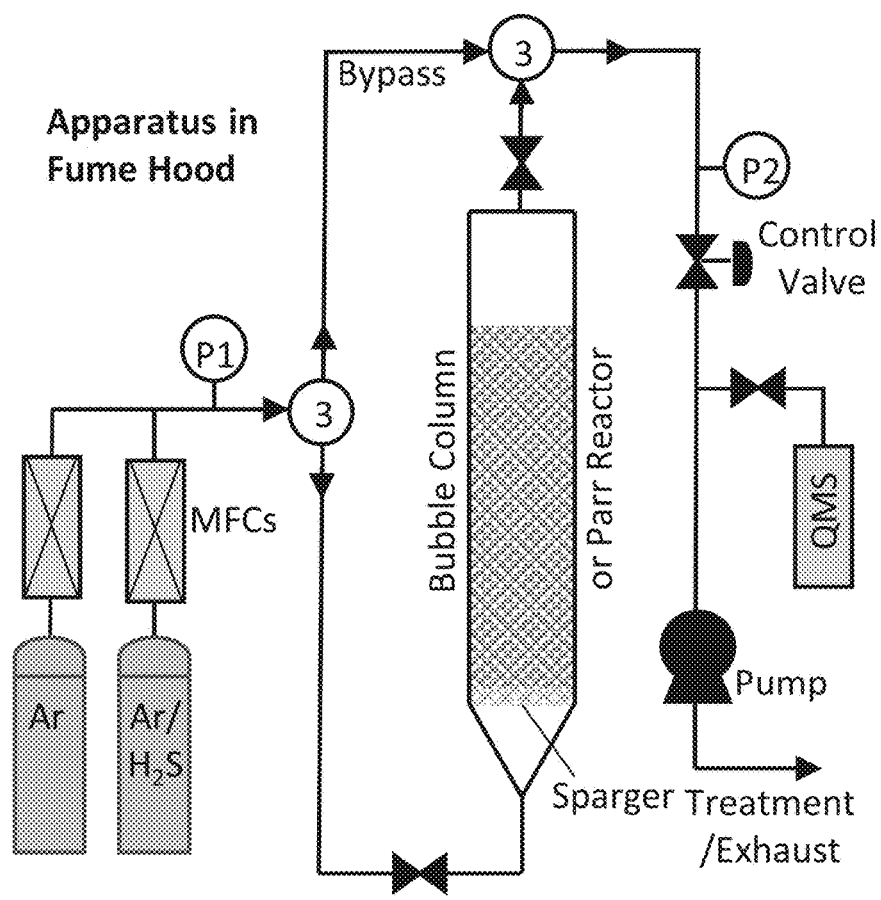
FIG. 4 is a schematic of one embodiment of the disclosed experimental system.

A schematic diagram of one embodiment of a system for use with the disclosed processes and methods is shown in FIG. 4. In this embodiment, a 10% mixture of $H_2S$ diluted in Ar is delivered through an electronic mass flow controller (MFC) where it can be mixed with additional Ar diluent. In some embodiments, a pair of three-way valves the gasses can either bypass or be delivered through the reactor. In this embodiment, a reactor is shown that may be a Parr reactor (e.g. constructed of stainless steel or other suitable material) or bubble column using the same gas handling equipment. The depicted system may be evacuated by a mechanical pump and the effluent composition can be evaluated in real-time using a differentially pumped quadrapole mass spectrometer (QMS).

Numerous safety measures may be used to minimize escape of $H_2S$. In this regard an unpleasant but quite useful property of $H_2S$ is its characteristic odor of rotten eggs. $H_2S$ is detectable at concentrations as low as 0.5 ppb, which is more than 4 orders of magnitude below the ceiling of 20 ppm for safe exposure in the workplace established by the US Occupational Safety and Health Administration. As such, any incidental leaks would be readily detected well before becoming a danger, much like mercaptans added to natural gas. As depicted in FIG. 4, the $H_2S$ tank and the reactor are housed in a fume hood.

In some embodiments, prior to beginning the reaction various gas lines of the system may be pumped out until established base pressure and leak rates are met. This step may be useful in testing the integrity of various seals within the system. In some embodiments, the process and methods may be performed at slightly sub-atmospheric pressure (i.e. ~−30 torr gauge). For those embodiments where the system is run at sub-atmospheric pressures, the pressure difference may aid in preventing $H_2S$ from leaking out of the system if there is a leak or a seal is compromised. In many embodiments, the desired system pressure and gas flow behavior may be first established using an inert gas, for example argon, Ar, without added $H_2S$. In some embodiments, $H_2S$ may first be slowly added to the inert gas before introducing into the system, and the amount of $H_2S$ gradually increased as the flow of diluent Ar is reduced. In some embodiments, regulators on the Ar and/or Ar/$H_2S$ tanks may be set vary low, eg. a few psig, thus limiting the extent that the system may become over-pressurized e.g. in the case of a blocked line or closed valves. In the case of a blocked or closed line/valve, an alarm on the pressure gauge may allow immediately detection. In some embodiments, the use of large amounts of solvent may aid in controlling the exothermic nature of the reaction itself. In these embodiments $\Delta H_{rxn}/(m^*C_p) \ll 1$ due to the large amount of solvent, and the maximum rate of temperature increase, which may be less than about 0.01° C./s.

Figure 5:
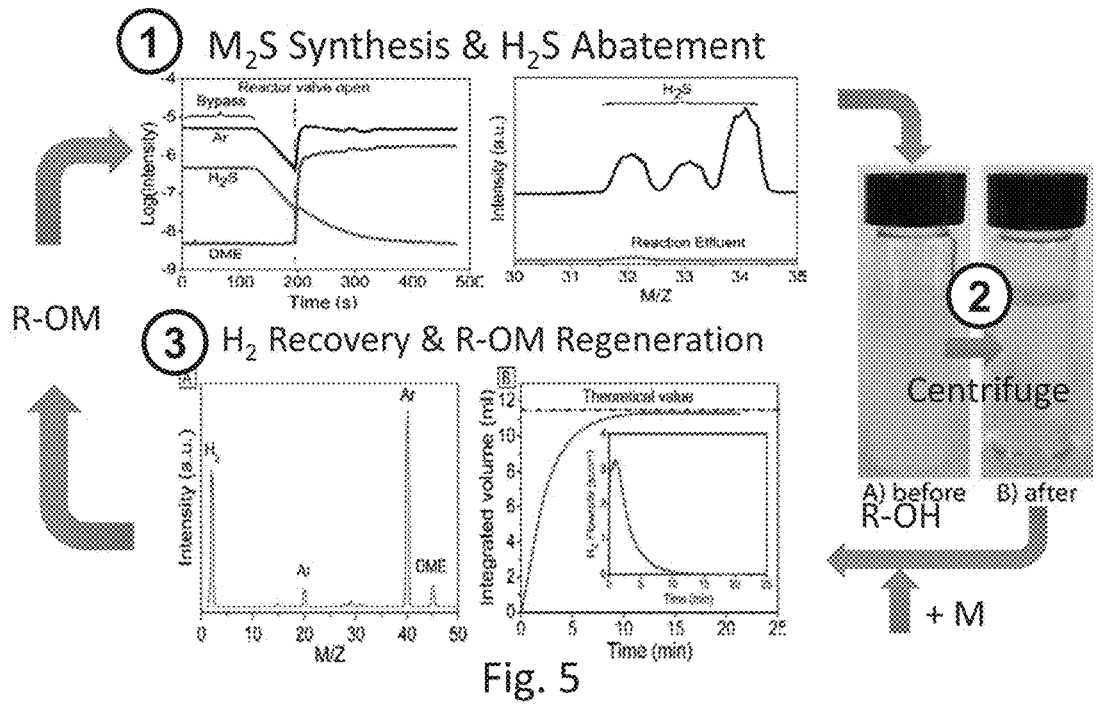
FIG. 5 is a schematic of one embodiment of a 3-step alcohol/alkoxide (ROH/ROM) process including on-line QMS measurements of $H_2S$ abatement in step 1, photos of the resulting $M_2S$ NP solution before and after centrifugation in step 2, and QMS data showing $H_2$ recovery in step 3.
Figure 6:
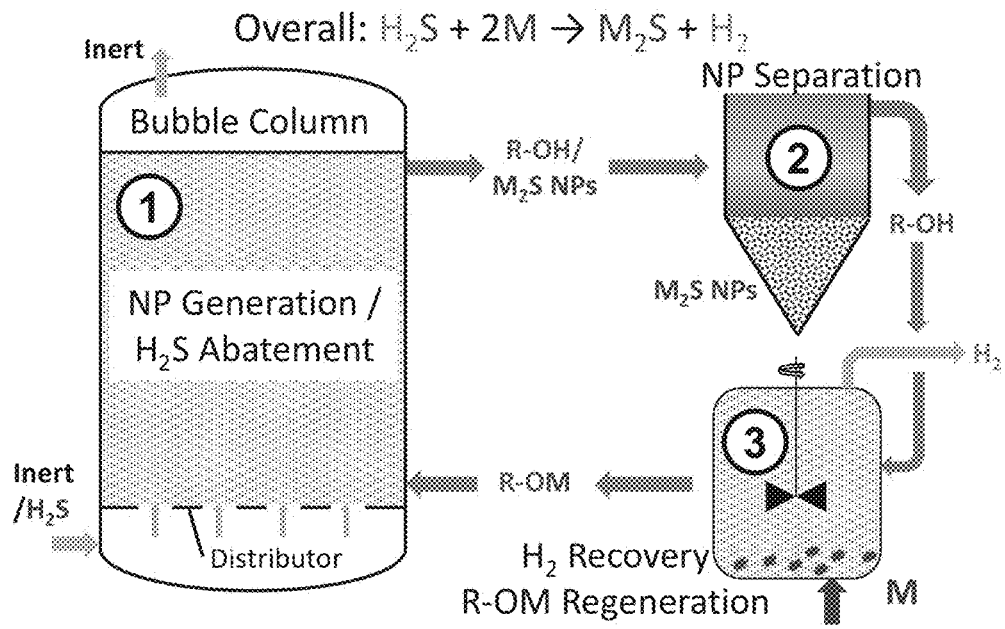
FIG. 6 is a schematic of one embodiment for use of the disclosed processes for scalable manufacturing of $M_2S$ nanostructures.

FIG. 5 shows results from using the disclosed methods and processes in a batch process. FIG. 6 displays a schematic representation of the process envisioned to transform the batch chemistry shown in FIG. 5 into a scalable manufacturing process capable of producing large amounts (e.g. up to tens of thousands of tons) of $Li_2S$ that may be required by next generation battery technologies and other industries. A principal focus of this work will be the bubble column reactor used for step (1), since this is the unit operation that controls the size and quality of the $M_2S$ nanostructures. The subsequent steps of NP separation (2) and reagent regeneration/$H_2$ recovery (3) are shown.

Design, Construction and Performance of the Bubble Column Reactor

In many embodiments the reactor may be of any form suitable to allow reaction of the metal/reagent/alcohol with $H_2S$ gas. In some embodiments, the reactor is a Parr reactor. In other embodiments the reactor is a bubble column reactor. In some embodiments, the bubble column for use with the disclosed methods and systems may be a tube, for example a tube made of Pyrex. In some embodiments, the bubble column may be a 1" OD Pyrex tube, which may further comprise connectors suitable for maintaining a vacuum and/or isolating the reactor. In some embodiments, the Pyrex tube may have vacuum grade quick flange connectors which may be adapted to the Swagelok®-based gas delivery system shown above in FIGS. 2A-2D. The reactor may further comprise a sparger, for example a $\frac{1}{16}$" thick disc of sintered stainless steel. The sparger may, in some embodiments, be sealed in place at the base of the column. The reactor may have various shapes to provide for transport in and through the reactor. In some embodiments, transport in the bubble column may be modified by adjusting the column's specific interfacial area, A $[m^{-1}]$. The interfacial area may be estimated by using $$A = \frac{6\varepsilon_G}{\bar{d}_B} \quad (1)$$

where $\varepsilon_G$ is the gas holdup and $\bar{d}_B$ is the mean bubble diameter. In many embodiments, gas holdup may be the fraction of the column occupied by gas, and may be determined by measuring the column height with and without gas flow. Bubble size is a complex function of both fluid and geometrical properties. In many cases, bubble size can be correlated, for porous spargers, using $$\frac{\bar{d}_B}{d_s} = 7.35 \left[ We^{-1.7} Re^{0.1} Fr^{1.8} \left( \frac{d_p}{d_s} \right) \right]^{1/5} \quad (2)$$

where $d_s$ and $d_p$ are the sparger diameter and pore size, respectively. Weber (We), Reynolds (Re) and Froude (Fr) numbers are dimensionless and defined as $$We = \frac{\rho U^2 d_s}{\sigma}; \quad (3)$$

$$Re = \frac{\rho U d_s}{\mu}; \quad (4)$$

$$Fr = \frac{U^2}{d_s g} \quad (5)$$

where U is the superficial velocity and $\rho$, $\mu$, and $\sigma$ are the physical properties of the liquid phase.

Figure 7:
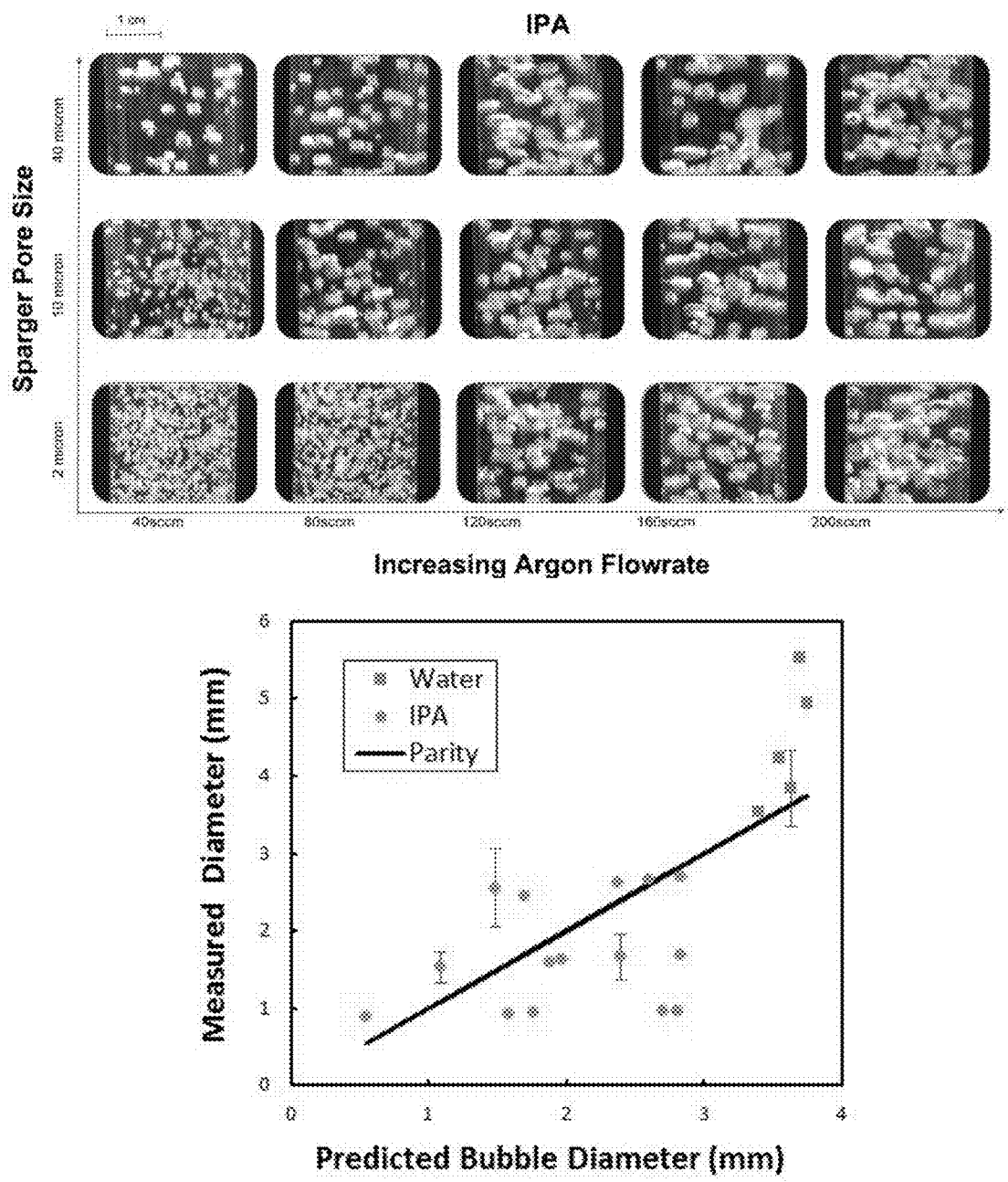
FIG. 7 shows bubble distribution in IPA as a function of Ar flowrate and sparger pore size. Parity plot, below, compares measured bubble size with predictions of Eq. (2).

Hydrodynamics of the disclosed bubble column can be evaluated by flowing a gas through a liquid, for example a gas and liquid that are representative of a gas and liquid for use with the disclosed methods and systems. In one embodiment, argon gas and either water or isopropyl alcohol (IPA) is used. Water and IPA have physical properties that are representative of the solvents listed in Table I. In many embodiments, the height of the liquid may be about 5-10× the column diameter. This may help to create a steady bubble flow pattern and maintain column mixing. FIG. 7 shows photographs of bubble column embodiments with various flowrates (40-200 sccm) and pore sizes (2-40 micron) using IPA. In many embodiments, the flowrate may be from a few sccm to several hundred or thousand sccm, depending upon the size and design of the reactor. In some embodiments, the pore size of the sparger may vary from sub-micron to millimeter sizes, for example from 0.5 µm to 2 mm. The flowrate and pore size may be selected to help provide for a homogenous flow regime. In many embodiments, the bubbles may be nominally spherical and monodispersed with little or no coalescence. In many embodiments, transport parameters such as specific area and bubble size may be systematically varied over a wide range by varying flow characteristics and reactor configuration.

Reactor Characterization

The disclosed processes and systems may, in some embodiments, be altered to control one or more characteristics such as of a transport-limited reaction, nucleation, growth, aggregation, etc. These characteristics may be used to control various properties of the $M_2S$ nanostructures produced (e.g. the morphology, particle size distribution, etc.). For example, the degree of saturation and/or supersaturation may help control the rate of nucleation and/or molecular growth. These rates, may in turn, help determine product size and morphology. In many embodiments, and without wishing to be limited by one theory, the fast reaction kinetics observed with the disclosed process suggest that the process may be transport limited. In these cases, where transport kinetics limit the reaction, it may be beneficial to characterize the hydrodynamics of the process.

Reactant solution concentration may also be varied to control one or more properties of the disclosed products. In many embodiments, low initial concentrations are used in the disclosed methods, for example initial reactant concentrations between about 1 and about 10 mM. In some embodiments, depending on the size and shape of the reactor used, higher initial concentrations may result in particles blocking the reactor. In other embodiments, greater initial concentrations may be used with little or no blockage of the reactor occurring. In some embodiments, blockage, for example due to high initial concentrations, may be fully or partially mitigated by the use of a bubble column reactor. In these embodiments, dispersion of the reactants is enhanced and a gas flow through the reactor may be established with an inert gas prior to a gradual introduction of $H_2S$. In these embodiments, the concentration and/or throughput could be increased, for example between one and two orders of magnitude. In most embodiments, purification time may be independent of the amount of NPs generated in a batch mode. In some embodiments, reagent concentration may also affect product morphology. In some embodiments, a localized supersaturation may affect both nucleation and particle growth. Thus, in some embodiments, higher initial reactant concentrations may result in smaller particle sizes.

Three phases (gas, liquid, solid) may be monitored during the disclosed process. In these embodiments, tracking the phases may help to monitor and/or evaluate the progress of the disclosed reactions. In many embodiments, gas phase effluent can be analyzed by various methods, for example by QMS. Formation of solid nanoparticles may also be monitored, for example by using UV-Vis-NIR turbidity measurements. In these embodiments, in situ turbidity may be an effective method to measure the particle size and size distribution. In some embodiments, turbidity may be measured using a UV-Vis-NIR (200 nm-2000 nm) spectrometer with an optical probe may be used. In some embodiments, turbidity measurements may be calibrated using pre-formed particles and validated with ex situ analysis by ZetaPALS and electron microscopy. Generally, ZetaPALS employs phase analysis of light scattering (PALS) to determine both the particle size distribution and the zeta potential (surface charge) of particles suspended in organic medium. In most embodiments, the zeta potential parameter may help determine whether NPs are likely to coagulate (<|±30 mV|) or remain stable (>|±40 mV|) in solution. SEM and TEM may be used to help provide direct measurements of the nanoparticle morphology. The composition of the liquid phase can be analyzed by standard techniques well known to those of skill in the art. In some embodiments, the liquid phase is analyzed using one or more of gas chromatograph (GC), nuclear magnetic resonance (NMR), and fourier transform infrared spectroscopy (FTIR). In some embodiments, the reaction may be stopped at intermediate stages so that the liquid phase supernatant can be analyzed. In other embodiments, the liquid phase may be sampled without the need to stop the reaction, e.g. through continuous sampling.

In various embodiments, one or more of X-ray diffraction (XRD), scanning electron microscopy (SEM), and/or thermogravimetric analysis (TGA) may be used to characterize one or more of crystallinity, morphology, and purity of the $M_2S$ particles. In some embodiments, inductively coupled plasma-mass spectrometry (ICP-MS) may be used to achieve resolution of between ppm and ppb. This may help to determine product purity. In some embodiments, product purity may be greater than about 90%, 91%, 92%, 93%, 94%, 95%, 96%, 97%, 98%, 99%, 99.1%, 99.2%, 99.3%, 99.4%, 99.5%, 99.6%, 99.7%, 99.8% or 99.99%. In many embodiments, dryness of battery materials should be ≤0001% of $H_2O$. This may be measured by Karl-Fischer titration to reach the detection limit of 1 ppm.

The electrochemical performance of the disclosed NPs will also be tested. In many embodiments, electrochemical performance may be compared to commercially obtained micropowders. In many embodiments, the disclosed nanoparticles display electrochemical performance that is equal to or greater than commercially obtained micropowders.

Hierarchically Structured Cathode Materials in Metal-Sulfur Batteries

Disclosed herein is a method and system for creating $M_2S$—NCs@C HSs-based cathodes. One embodiment of the disclosed method of synthesizing $M_2S$—NCs@C HSs is shown in FIG. 8. Applicants disclose herein a novel and non-obvious, scalable, energetically-efficient, and solution-based process that both directly synthesizes $M_2S$—NCs and enables the inclusion of a polymer with a potentially higher carbon-producing yield in the subsequent carbonization step. In this exemplary embodiment, the $M_2S$ synthesis can be organically integrated into the goal to produce $M_2S$—NCs@C HSs, without the need for separating and re-dissolving $M_2S$—NCs. As disclosed herein, with the present methods and systems, $M_2S$ does not need to be highly soluble in the selected solvent; and the polymer can assist the formation of size-tunable NCs and govern the quality of the carbon matrix.

In various embodiments, an organic solution is first made, wherein the solution contains a Metal-precursor and a polymer (FIG. 8-I). When the solution is thereafter reacted with a Sulfur-precursor, $M_2S$—NCs will be produced and immobilized by the polymer (FIG. 8-II). Next, in this embodiment, $M_2S$—NCs@polymer composites (FIG. 8-III) are obtained after removing the solvent via evaporation, after which, the $M_2S$—NCs@polymer composites are heated under argon to help carbonize the polymer and produce $M_2S$—NCs@C composites (FIG. 8-IV). Finally, an outer carbon shell is created to produce the targeted $M_2S$—NCs@C HSs (FIG. 8-V). The disclosed method steps produce $M_2S$—NCs@polymer composites, $M_2S$—NCs@C composites, and $M_2S$—NCs@C HSs in ways that are similar to methods described by Yushin.

EtOM+DME

In this embodiment, $Na_2S$ was synthesized using ethanol ($C_2H_5OH$, EtOH) as the organic complexing reagent for producing sodium ethoxide (EtONa). A single reactor was used for both steps, Reactions 3 and 4. However, Reaction 4 was performed prior to Reaction 3. Specifically, in these embodiments Na was first placed into the reactor (here, a Parr reactor) in an Ar-filled glove box and the reactor was sealed. Next, a mixture of the ethanol dissolved in DME was introduced into the reactor. After several hours, Ar was flowed into the reactor to flush out the headspace gases, which were then characterized by online quadruple mass spectrometry (QMS). FIG. 9A displays a typical mass spectrum taken from the headspace gases from the reactor.

The only gas product detected was $H_2$, along with the Ar carrier gas. However, signatures from the volatile ethanol and DME were also detected. The inset of FIG. 9B shows the flowrate of $H_2$ leaving the reactor during Ar purging, which was calculated by calibrating the QMS with concentration-controlled $H_2$/Ar mixtures. FIG. 9B shows the integrated volume of $H_2$ released during the experiment, and it is in very good agreement with the theoretical value (the dashed line) based on the initial amount of Na supplied to the reactor. The $H_2$-recovery yield is 98%, showing that reaction 3 nominally proceeds stoichiometrically to completion at room temperature.

After the $H_2$ signal dropped to zero, the reactor was closed. The content of the reactor should be EtONa dissolved in DME with Ar in the headspace. At this point, a premixed gas stream consisting of 10% $H_2S$ and 90% Ar was bubbled through the reactor at a controlled flowrate. FIG. 10A compares the mass spectra recorded from the bypass mode and the reaction effluent mode. When bypassing the reactor, $H_2S$ is readily detected, as evidenced by its characteristic fragments at M/Z=32-34. When characterizing the effluent it is clear that besides the complete removal of $H_2S$, reaction 4 regenerated ethanol, as shown by its prominent fragment at M/Z=31. FIG. 10B shows the temporal evolutions of $H_2S$ and Ar during this experiment. The initially steady signals reflect the composition of the $H_2S$/Ar mixture. When the bypass was closed at ~40 s (dotted line), both signals plummeted, reflecting the dynamics of the gas sampling system. When the reactor valve was opened at ~200 s, the Ar signal instantly rebounded to its original value while $H_2S$ remained at the detection limit, showing that $H_2S$ abatement was complete. The reaction was stopped when the molar ratio of EtONa/$H_2S$ reached 2. The solid precipitate was collected and analyzed. Well-dispersed, phase-pure, cube-like $Na_2S$—NCs of ~100 nm were obtained, as confirmed by X-ray diffraction (XRD, FIG. 10C) and scanning electron microscope (SEM, FIG. 10D). According to the Scherrer equation, which correlates crystalline domains with XRD peak width, the nominal crystal sizes in $Na_2S$—NCs are ~30 nm.

Hydrogen nuclear magnetic resonance ($^1H$ NMR) was performed on the remaining solution and confirmed the conversion of EtONa into EtOH. The experiment was repeated using the converted EtOH. In these repeat experiments, identical, phase-pure $Na_2S$—NCs were again produced, validating the potential of the process for recycling ROH.

$M_2S$—NCs were successfully synthesized using a variety of solvents. In these experiments, as discussed above, solvents are chosen for chemical compatibility with an ROM, $H_2S$, and $M_2S$. Additional solvent characteristics are also reviewed including boiling point, viscosity, surface tension, polarity, transport parameters, volatility, costs, ease of handling, etc. Viscosity ($\mu$) and surface tension ($\sigma$) may aid in tuning the crystal sizes through their different mass transport properties during reactions. Boiling point (b.p.) may affect solvent removal during the product purification. As described above, Table 1 summarizes the physical properties of the solvents examined and the results in yielding $M_2S$—NCs.

HS Synthesis using $M_2S$—NCs@C

For synthesis of $M_2S$—NCs@C HSs, the solvents may be selected based, at least in part, on the ability to dissolve a given polymer. In some embodiments, the solvent is also able to dissolve the $M_2S$, but this ability is not required. In most embodiments, the selected polymer does not react with other reagents used in the disclosed methods. However, the selected polymer will produce carbon under an inert atmosphere, in most embodiments via pyrolysis at high temperatures in an environment that lacks oxygen. Further, in many embodiments, the selected solvent may provide nucleation sites and may also assist the solvent in tuning $M_2S$—NCs size. In some embodiments, the polymer may be selected from polyvinylpyrrolidone (PVP, $[C_6H_9NO]_n$), poly(2-ethyl-2-oxazoline) (PEOZ, $[C_5H_9NO]_n$), and polyacrylonitrile (PAN, $[C_3H_3N]_n$). In most embodiments involving PVP or PEOZ, the solvent may be selected from DME, DBE, and DMF. In embodiments using PAN as a polymer, the solvent may be DMF. As mentioned before, the carbon-producing yield of PVP is about 12%, while its carbon-containing fraction is 64.8%. In stark contrast, the carbon-producing yield from PAN can be as high as 60%, very close to its carbon-containing fraction of 67.9%. The carbon-producing yield for PEOZ is unknown, but its carbon-containing fraction is 60.6%.

In some embodiments, EtOH may be used as the solvent. In most of these embodiments the polymer may be selected from PVP and PEOZ for synthesis of M2S—NCs@C HSs. In most embodiments, M2S is soluble in EtOH and this solubility may be beneficial for production of M2S—NCs@C HSs. In many embodiments, where EtOH is the solvent, PVP can be added before the M2S synthesis, or alternatively after M2S is synthesized.

Functional groups in the polymer, such as C=O and C≡N, may have an affinity for $M_2S$ and may help to influence particle sizes. Moreover, the nitrogen-containing polymers described above may be useful in producing N-doped carbon during carbonization. N-doping has been demonstrated to help minimize dissolution of metal polysulfides, a serious problem in S and $M_2S$ electrodes. As many suitable polymers, such as those disclosed above, contain different fractions of oxygen and nitrogen, they may affect synthesis and electrode performance differently. In some embodiments, PAN may be the preferred polymer for making $M_2S$—NCs@C HSs and may also lead to enhanced electrode performance.

Method of Making Hierarchical Structures

In some embodiments involving the synthesis of hierarchical structures, the first step may involve making a $M_2S$—NCs/polymer solution. In many embodiments, conditions may be varied to select or tune the characteristics including: concentration of EtOM, mass ratio of EtOM/polymer, mass ratio of EtOH/solvent, and flowrate of $H_2S$/Ar. The second step may involve evaporating the solvent to obtain $M_2S$—NCs@polymer composites. This step may be, in some embodiments, performed in a tube furnace under an inert gas (e.g. Ar). In some embodiments, this step is performed outside a glove box. Heating temperatures may be varied depending upon the solvent. In some embodiments, the heating temperature is about 60° C., for example in embodiments using DME. In some embodiments, for example those involving DBE or DMF, the heating temperature may be about 100° C. In some embodiments, the pressure of the a chamber containing the nanoparticles or crystals may be reduced to aid in removal of the solvent.

The third step involves making $M_2S$—NCs@C composites. In many embodiments, this step may not include removal of previously obtained $M_2S$—NCs@polymer composites from the tube furnace. In other embodiments, the composites may be removed from the furnace and transferred to a second furnace for heating to a pyrolytic temperature. In some embodiments, the pyrolytic temperature may be greater than about 500° C., and in one preferred embodiment may be about 700° C. In many embodiments, the pyrolytic temperatures may be in the range of 500-700° C. depending on the desired characteristics of the carbon matrix and electrode performance.

The temperature in steps second and third may be changed at a rate of about 1-10° C./min. In many embodiments, the final temperature is obtained after about 30 min to about 10 hours, or more. In some embodiments (e.g. where PAN is used), a further stabilization step may be included. In these embodiments, the stabilization step may include maintaining a temperature of about 250-300° C. for about one hour. The stabilization step may aid in enhancing the carbon matrix. Carbonizing the disclosed polymer may aid in encapsulation of the $M_2S$—NCs and reducing or eliminating sintering at high temperatures.

The final step may involve building an outer carbon shell around the composites. In these steps, the carbon shell may be built via CVD or sputter coatings. In some embodiments, grinding the composites in a mortar before coating may provide for a more uniform coating. In many embodiments, the carbon shell's thickness may be varied by controlling the coating duration or other parameters. The disclosed methods and processes may be varied to help tune the properties of the resulting $M_2S$—NCs@C HSs. In these embodiments, altering synthesis characteristics may help to vary crystal size, N-doping level, conductivity of the carbon matrix, thickness of the outer carbon shell, etc.

Sample characterization may be performed throughout the disclosed process. This characterization can be helpful in determining structures of the various materials and may help to optimizing synthesis during the procedure. In some embodiments, e.g. during initial $M_2S$ synthesis, the $H_2S$ consumption amount and rate will be monitored by online QMS, as shown in FIG. 8. In most embodiments, the process will be controlled so that the molar ratio of EtOM to $H_2S$ is 2, it is possible that some embodiments may result in a ratio of EtOM to $H_2S$ that is slightly below 2. In most embodiments, however the ratio of EtOM to $H_2S$ will not be above 2 (e.g. 2EtOM: 1$H_2S$). In embodiments having a ratio of EtOM to $H_2S$ below 2, the excess $H_2S$ may react with the $M_2S$ to generate metal hydrosulfide (MHS) and the MHS may then decompose into $M_2S$ and $H_2S$ at temperatures above 200° C., i.e. during the subsequent carbonization step. In most embodiments where MHS is formed, there may be little or no effect on the quality of $M_2S$—NCs@C HSs.

Samples in subsequent steps may be characterized by various methods well known in the art. For example, XRD can be used in some embodiments to determine the phase-purity and crystallinity of the products. In some embodiments, SEM and transmission electron microscope (TEM) may be used to analyze morphological information (e.g. crystal sizes, shapes, etc.). High resolution TEM can also be used to measure the thickness of carbon shells. Energy dispersive X-ray spectroscopy (EDX) and X-ray photoelectron spectroscopy (XPS) may also be used to analyze and/or verify various elemental compositions, for example, in some embodiments the N-doping level. Raman spectroscopy and Fourier transform infrared (FTIR) spectroscopy can be used to analyze the carbon quality, for example by interrogating samples for C=O and C≡N peaks and monitoring disappearance of these peaks from the polymers and the appearance of D-band and G-band from the carbon matrices. In some embodiments, thermogravimetric analysis (TGA; for example using oxygen as the carrier gas) can be used to determine the carbon-producing yield of the polymer by comparing the weight loss of $M_2S$, $M_2S$—NCs@polymer and $M_2S$@C. In these embodiments, the $M_2S$ may be fully oxidized to $M_2SO_4$ while the polymer and the carbon will be fully burned. TGA can also be used to analyze the thermal stability of the samples under an inert gas atmosphere. The Brunauer-Emmett-Teller (BET) technique can be used to measure the specific surface area and porosity (pore sizes and size distributions) of the produced $M_2S$—NCs@C HSs. Conductivity of the carbon matrix can also be measured by making a thin film of carbon without $M_2S$ and using the standard four-probe technique.

Assessments of the Electrode Performance

Electrodes comprising the disclosed $M_2S$—NCs@C may be constructed in various ways. Fabrication of electrodes with the disclosed products is conducted in a glove box by using the standard slurry method. In many embodiments, a first step involves placing appropriate amounts of dry $Li_2S$ powder ('s-Li2S' produced by the disclosed method), acetylene black, and PVDF binder in a mortar prior to manual blending to create a mixture. This mixture is then dispersed in an appropriate amount of N-methyl-2-pyrrolidone (NMP), and stirred, for example overnight, to create a homogeneous slurry. The obtained homogenous slurry may then be bladed onto a carbon paper current collector (e.g. AvCarbP50) and then dried at about 110° C. for about 6 hours, to create electrodes. The electrodes are then cut into small discs. The mass loading of $M_2S$ is ~1.0 mg/cm$^2$. Last, Swagelok cells batteries or coin cells are assembled by using lithium ribbon as the anode, polypropylene membrane (Celgard 2500) as the separator, and 1.0 M lithium bis(trifluoromethane)sulfonimide (Li-TFSI) in tetra(ethylene glycol) dimethyl ether (TEGDME) as the electrolyte solution. For benchmarking purposes, the identical procedure is used to fabricate electrodes with commercially sourced $Li_2S$ (c-$Li_2S$).

Figure 11A:
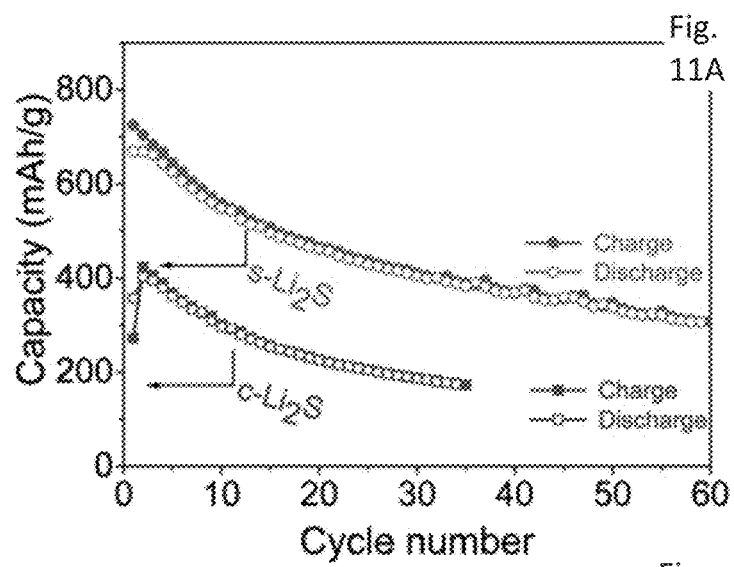
FIG. 11A-C shows results from performance assessments on one embodiment of synthesized $Li_2S$—NCs (s-$Li_2S$), using Li-NAP as the reagent to react with $H_2S$: 11A, cyclability at 0.1 C with commercial $Li_2S$ (c-$Li_2S$) as comparison; 11B, CVs for the first four cycles; 11C, EIS spectra at open-circuit-potential (OCP), 1.5 V, and 3.0 V for several selected cycles.

Electrode cyclability can be examined by the galvanostatic cycling technique on a multiple-channel battery analyzer. In this case a constant charging/discharging current (typically at 0.1 C, 1 C=1166 mA/g for $Li_2S$) is applied within a potential window. As shown in FIG. 11A electrodes fabricated using the disclosed $Li_2S$ synthesis method (s-$Li_2S$) is superior to electrodes comprising commercially sourced $Li_2S$ (c-$Li_2S$). For example, the initial charge (delithiation) capacity is 724 mAh/g for s-$Li_2S$, comparing well with the theoretical limit (1166 mA/g). The half-life, defined as the cycles spent to reach 50% of the initial charge capacity, is 45 cycles for s-$Li_2S$. In contrast, the initial charge capacity of c-$Li_2S$ is about 272 mAh/g, while in the second cycle the charge capacity bounces to 424 mAh/g. The stability of c-$Li_2S$ declines in a similar fashion, but reaches its half-life after about 23 cycles.

The disclosed $Li_2S$ compares favorably with some existing $Li_2S$ materials. For instance, an $Li_2S$/C nanocomposite made by ball-milling $Li_2S$ micropowder and carbon precursor resulted in an initial specific capacity of 560 mAh/g and 420 mAh/g at the 30$^{th}$ cycle.

Figure 11B:
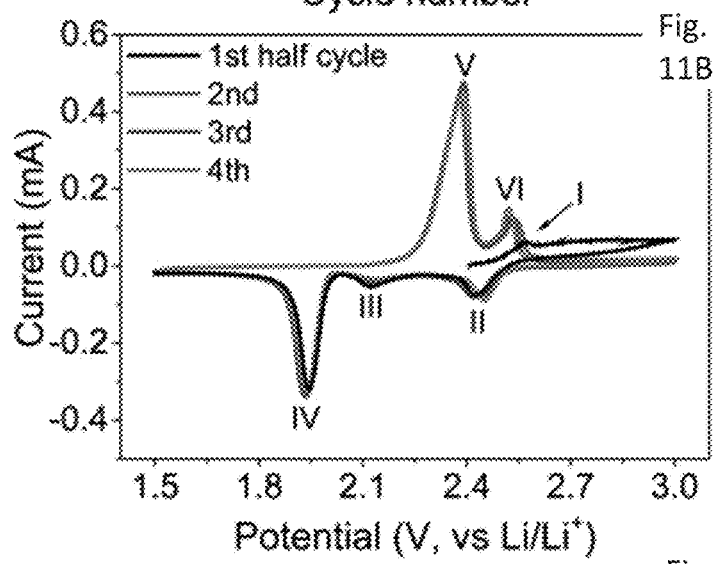

Cyclic voltammograms (CVs) reveal the electrochemical reactions during the charging/discharging cycles. The profiles of s-$Li_2S$ in FIG. 11B are consistent with those of $Li_2S$ electrodes in literature. In the first half cycle, the anodic current with a weak peak at 2.57 V (peak I) corresponds to the delithiation of $Li_2S$ to form sulfur ($S_8$). In the subsequent cathodic scans, three characteristic peaks are observed at 2.44 V (peak II, strong), 2.12 V (peak III, weak) and 1.94 V (peak IV, very strong), respectively. Peak II is assigned to the reduction of $S_8$ to polysulfides ($Li_2S_n$, n=4-8) in three steps. Peak III is from the reduction of $Li_2S_4$ to insoluble $Li_2S_2$. Peak IV is due to the conversion of $Li_2S_2$ to $Li_2S$. In contrast, the subsequent anodic scans have two distinguishable peaks at 2.39 V (peak V) and 2.53 V (peak VI), which correspond to the oxidations of $Li_2S$ to $Li_2S_n$ and $Li_2S_n$ to $S_8$, respectively.

Figure 11C:
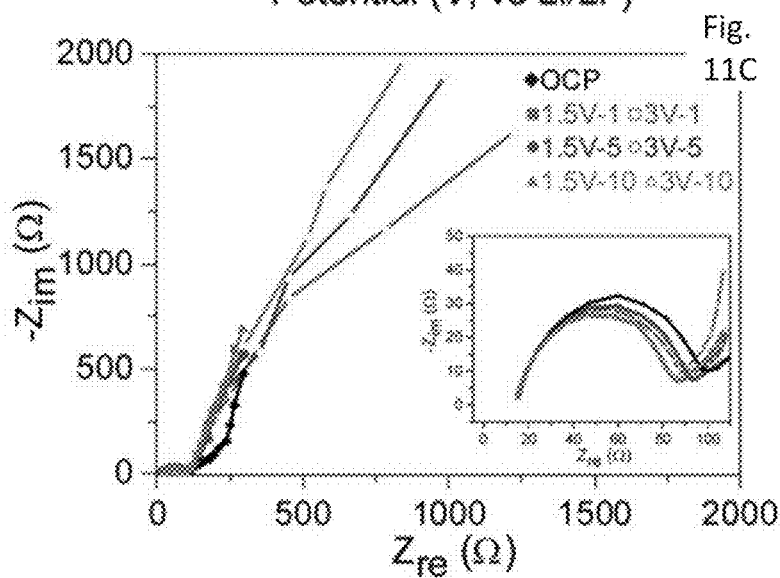

Electrochemical impedance spectroscopy (EIS) measures the characteristics of charge transfer outside the electrode, at the electrode/electrolyte interface, and inside the electrode. The EIS spectra in FIG. 11C show that the resistance outside the electrode ($R_S$) is ~15Ω in all selected cycles for both states of $S_8$ and $Li_2S$. The charge transfer resistance ($R_{CT}$) at the electrode/electrolyte, which equals the magnitude of the semicircle, decreases with cycling. The smaller magnitude of the linear range for $Li_2S$ (at 1.5 V) than for $S_8$ (at 3.0 V) indicates that the former has a smaller internal charge diffusion resistance (Warburg impedance, $Z_W$). Overall, the little change of $R_{CT}$ and $R_S$ with cycling indicates a stable structure.

Additional electrochemical analyses can be used to test the fabricated electrodes. For example, rate capability can be studied by using different current densities during galvanostatic cycling. Potential profiles, obtained simultaneously from the galvanostatic cycling, can be used to reveal charging/discharging energy efficiency and to determine if there are activation energy barriers and well-defined phase transitions. A smaller voltage difference between the charging and discharging plateaus may indicate a higher energy efficiency. The Coulombic efficiency, which is the ratio of discharging capacity vs charging capacity in the same cycle, can be plotted against the cycle number to illustrate long-term electrochemical efficiency. The capacity comparison will also include the capacity density, for which the mass measurement includes conductive additives and binders. For these tests, a relatively large amount of slurry will be applied to aluminum foil to make a uniform thin film. Then, the volume of the thin film can be calculated by measuring its thickness and surface area. Last, using the obtained volume per unit of mass, the actual volume of a single electrode can be calculated by measuring its mass.

Other techniques will be used to analyze the chemical and structural evolution of the disclosed electrodes. For example, XRD can be used to determine changes in crystalline phases and sizes. SEM/EDX and TEM/EDX can be used to record changes in morphology (such as cracks or not) and elemental distribution. ICP-MS and XPS can be used to measure the extent of polysulfide dissolution in the electrolyte solution. This analysis may aid in determining how the disclosed $M_2S$—NCs@C HSs help to avoid problems caused by polysulfides. In most embodiments, M-TFSI/TEGDME will be used as the electrolyte solution. In other embodiments, other solvents may also be used (e.g., 1,3-dioxolane), as well as on or more additives (e.g., $LiNO_3$), which may be well known to those of skill in the art. The described performance results may help provide feedback for optimizing one or more synthetic conditions.

Charging/Discharging Mechanisms of $M_2S$

TEM in-situ studies may be performed to aid in determining the charging/discharging mechanisms of electrode comprising one or more of the disclosed products. For example, FIGS. 12A-C shows results from studies of similar materials. As shown in FIG. 12A, the positions of a single sulfur particle cathode and a lithium needle anode can be precisely controlled by a specially designed TEM sample holder. In these experiments, the tip of a lithium needle is oxidized to form a thin layer of lithium oxide ($Li_2O$), which functions as a solid-state electrolyte film. When a negative 3 V is applied to the cell for discharge, lithium reacts quickly with sulfur at the interface once the anode reaches the cathode, as indicated by the contrast change at the sulfur surface (FIG. 12B). After 10 s, a thin layer with a lighter contrast forms on the sulfur surface. With time, the new layer spreads over the outmost surface of sulfur without getting deeply into the bulk of the sulfur particle. FIG. 12B also shows that the Li—S reaction in the cell occurs preferentially through surface diffusion rather than radial diffusion and forms a solid $Li_2S$ crust, whose identification is provided by selected area electron diffraction (SAED) patterns (FIG. 12C). Without wishing to be held to one theory lithium polysulfides may form prior to $Li_2S$, or sulfur may be directly reduced to $Li_2S$. The results shown in FIG. 12C suggests that because of the surface-diffusion characteristics of Li—S reaction, the use of nanoscale sulfur particles with a high specific surface area may help improve the sulfur utilization during discharge.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

EXAMPLES

Example 1

Alkali Metal Sulfide Nanoparticles

The chemistry underlying the disclosed methods for the scalable manufacturing of $M_2S$ nanostructures is shown below at Scheme 1. Specifically, the disclosed methods produce anhydrous, phase-pure $M_2S$—NPs through the reaction of $H_2S$ and alkali metals. The alkali metals are introduced in the form of metalorganic complexes (R-M) dissolved in solutions. The disclosed reaction is thermodynamically favorable, and it proceeds to completion instantly and irreversibly at ambient temperature. In most embodiments, valuable $H_2$ gas can be recovered when the R-M complex is regenerated. Thus, in most embodiments the net reaction is $H_2S+2M \rightarrow M_2S+H_2$.

The disclosed process is based on the tenets of green chemistry and engineering. Typically, the alkali metal is an important element and cost driver in any advanced battery technology, and, therefore, must be used efficiently. The disclosed process is 'green' in that it proceeds with an atom economy approaching 100%, meaning that the M and $H_2S$ supplied are completely (or nearly completely) converted into $M_2S$ and $H_2$. $H_2S$ is a dangerous pollutant and health hazard that represents a major liability for oil and gas production. The disclosed process results in abatement of $H_2S$, and may be part of a comprehensive solution to this industrial waste problem. Another green principle is that the process is designed for separation of the various products, since the solid ($M_2S$) and vapor-phase ($H_2$) products are readily separated from the solution which can then be recycled/regenerated. Lastly, this process requires little or no thermal energy input. In most embodiment, the process may proceed at room or ambient temperature.

The combination of hazardous waste removal ($H_2S$), co-generation of valuable byproducts ($H_2$) and the absence of significant energy requirements suggests that at scale this process will be able to generate $M_2S$ NPs without significant at or about the cost of the metal reagent alone.

The disclosed process has been used with naphthalene (NAP, $C_{10}H_8$) as the organic complexing agent, R. In these embodiments, both $Na_2S$ and $Li_2S$ NPs were efficiently produced by the following reaction:

$$2M\text{-}C_{10}H_8 + H_2S \rightarrow M_2S + 1,4\text{-}C_{10}H_{10} + C_{10}H_8 \qquad \text{Reaction 1}$$

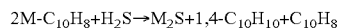

Reaction 1 was found to be spontaneous, rapid, and proceeded to completion at room temperature, reducing $H_2S$ in the effluent below detection limits with the successful synthesis of pure $M_2S$ nanocrystals. The yield of $M_2S$ NPs based on the initial mass of metal used to generate the complex was as high as 96%. The results using naphthalene were very encouraging, but a few aspects could be further improved. First, rather than evolution of hydrogen gas, the hydrogen was captured in the form of 1,4-hydrogennaphthalene (1,4-$C_{10}H_{10}$, commonly known as 1,4-dialin). Although 1,4-dialin has added value as a solvent, recovering $H_2$ directly may be, in some embodiments, the preferred form for some applications, for example industrial applications. Moreover, recycling/regeneration of the organic reagent as depicted in Scheme 1 was not straightforward in the naphthalene system. Below, an alternative embodiment of the disclosed process is described.

In this embodiment, naphthalene was replaced with alcohol as the complexing reagent. In these embodiments, $M_2S$ NP synthesis and $H_2S$ abatement may be accomplished in one step, while $H_2$ recovery and reagent regeneration may occur in a second step. This embodiment is expressed below in Reactions 2-4.

Reaction 2)

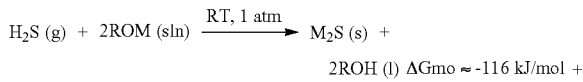

Reaction 3)

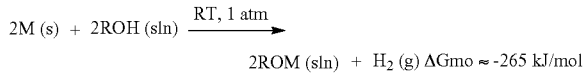

Reaction 4)

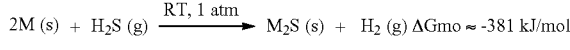

In the first step (rxn 2) $M_2S$ nanocrystals precipitate from the reaction of $H_2S$ with a metal alkoxide precursor, regenerating the alcohol reagent. After removing the NPs by centrifugation, the solution is reacted with fresh alkali metal to regenerate the metal alkoxide precursor and release $H_2$ (Reaction 3). Here, Applicant demonstrates and quantifies the individual process steps using reactive precipitation of $Na_2S$ from NaOEt in EtOH/DME as a model system. Next, the flexibility of the process to engineer the morphology of the $Na_2S/Li_2S$ nanoparticles through appropriate selection of various alcohol/solvent combinations is demonstrated.

Materials—Chemicals:

Sodium (Na, ACS reagent, stick dry), ethanol (EtOH, $CH_3CH_2OH$, anhydrous, containing 5% isopropyl alcohol, 5% methyl alcohol), 1-butanol (butanol, $CH_3(CH_2)_3OH$, anhydrous, 99.8%), 1-hexanol (hexanol, $CH_3(CH_2)_5OH$, anhydrous, ≥99%), 1,2-dimethoxyethane (DME, $CH_3OCH_2CH_2OCH_3$, anhydrous, 99.5%), 2-methyltetrahydrofuran (2-MeTHF, $C_5H_{10}O$, anhydrous, 99%), 1,4-dioxane (dioxane, $C_4H_8O_2$, anhydrous), dibutyl ether (DBE, $CH_3(CH_2)_3)_2O$, anhydrous, 99.3%), toluene ($C_6H_5CH_3$, anhydrous, 99.8%) and hexane ($CH_3(CH_2)_4CH_3$, anhydrous, 95%) were purchased from Sigma-Aldrich. Lithium foil (Li, 99.9% trace metals basis, 0.75 mm thick×19 mm wide) was purchased from Alfa Aesar. Anhydrous benzene-D6 ($C_6D_6$, D-99.5%) was purchased from Cambridge Isotope Lab.

Sodium sulfide nonahydrate (Na$_2$S.9H$_2$O, 98.0%) was purchased from Fisher Scientific. Dioxane was treated using Na metal to remove trace amount of water. All other chemicals were used as received.

Methods—Synthesis of Na$_2$S and Li$_2$S

Appropriate amounts of alcohol (ROH, ethanol, butanol, or hexanol) and alkali metal (Na or Li) were sequentially added into 40 mL solvents of DME, 2-MeTHF, dioxane, DBE, toluene or hexane in an Ar-filled glove box (MBraun LABstar MB10 compact) to make a 0.05 M alkoxide (MOR) solution. The molar ratio of ROH to M was set to 8, and after about two hours of stirring the metal totally reacted to form the MOR solution with residual ROH which helped to dissolve MOR into the solvents. Then, the MOR—ROH/solvent solution was placed in a Parr reactor (model 4793). After that, the reactor was connected to the gas line containing 10 atom % of H$_2$S in Ar. The schematic diagram of the apparatus is shown in FIG. 13A. Initially, the H$_2$S/Ar mixture at the rate of 40 sccm flowed through a bypass line to establish a baseline reading. Then, the bypass was closed and the H$_2$S/Ar flow was diverted into the Parr reactor to react with the MOR solution at ambient temperature and pressure. The effluent was evacuated using a vacuum pump and sampled in line using a differentially pumped quadrupole mass spectrometer (QMS, Stanford Research Systems RGA300). The overall molar ratio of MOR to H$_2$S supplied to the reactor was fixed at the stoichiometric 2:1 ratio, controlled by the duration of the gas flow into the reactor. At the end of the reaction, the reactor inlet and outlet valves were closed simultaneously.

At last, the reactor was transferred into the Ar-filled glove box. The reaction solution was centrifuged to separate the liquid phase and the solid phase. The solid phase was washed several times using the specific solvent used in the reaction and dried in the glovebox on a hot plate at 80° C. for further characterization. The liquid phase from the model reaction of NaOEt-EtOH/DME with H$_2$S was saved and stored in the glove box for further characterization.

Products Characterization:

X-ray diffraction (XRD) patterns were obtained on a Philips X'Pert X-Ray diffractometer using Cu Kα radiation (λ=0.15405 nm). The samples were prepared in the Ar-filled glove box by spreading sample powders onto glass substrates. A drop of mineral oil was used to cover the sample to prevent reactions with moisture in the air during measurements. The background contributed from the mineral oil (a smooth and broad peak centered at 17.2° spanning from 10 to 25°) was subtracted and corrected for. Scanning electron microscopy (SEM) images and Energy Dispersive X-Ray (EDX) spectra were collected on a Field Emission SEM (JEOL JSM-7000F FESEM) with a JEOL EDAX Detector. The samples were prepared by immobilizing the obtained sample powder on an aluminum stub using a double-sided carbon tape. The accelerating voltage was 5 kV and 15 KV for taking SEM images and EDX spectra, respectively. Thermogravimetric analysis (TGA) for Na$_2$S was performed using a Q50 TGA (TA Instruments). The pristine synthesized Na$_2$S was annealed and cleaned at 300° C. for 10 hours under Ar gas flow to get rid of any solvent absorbed on the powder surface. For comparison, another kind of pure Na$_2$S was obtained by annealing the commercial Na$_2$S.9H$_2$O at 300° C. for 10 hours under Ar gas flow. The TGA samples were prepared by pressing Na$_2$S powders into pellets inside the Ar-filled glovebox. Before each TGA run, the sample holder (an alumina pan) was cleaned by heating in the furnace under air to 800° C. for 15 minutes. To eliminate the influence of physisorbed gases during the sample preparation, samples were preheated at 50° C. for 30 minutes before collecting the valid TGA data. The nitrogen flow rate for the balance compartment and the sample compartment was 40 mL/min and 60 mL/min, respectively. The temperature ramp rate was 2° C./min from room temperature to 600° C.

In addition, hydrogen nuclear magnetic resonance spectroscopy ($^1$HNMR, JEOL ECA-500) was applied to compare the composition of the solutions before and after reaction with Na and the liquid supernatant recovered after centrifugation follow of Reaction 2. For the NMR test, 0.3 mL sample solution was mixed with 0.2 mL benzene-D6 and then loaded in a quartz sample tube.

Hydrogen Quantification:

In order to quantify the H$_2$ production from the reaction of metal with alcohol, the gas was collected in the Parr reactor. First, 30.0 mg Na and 35 mL DME were loaded into the Parr reactor. Then the reactor was closed and tightened. After that, the mixture of 5 mL DME and 0.63 mL EtOH was injected into the reactor through the outlet port. After several hours of stirring, the composition of the gas in the headspace of the reactor was tested by flowing the gas out of the reactor with pure Ar gas at the rate of 40 sccm and sampling using QMS. The QMS was calibrated by flowing known quantities of H$_2$ while keeping the Ar flow rate constant at 40 sccm (FIG. 14A). The instantaneous H$_2$ flow rate exiting the Parr reactor can be obtained by multiplying the slope of the calibration curve and the experimental QMS intensity ratio of H$_2$ to Ar (FIG. 14B).

Results and Discussion Model Reaction of Na$_2$S Nanocrystals Synthesis

NaOEt in EtOH/DME was used as a model system to demonstrate the strategy of M$_2$S synthesis outlined in Scheme 1. The NaOEt in EtOH/DME solution was transferred in the glove box to the reactor shown schematically in FIG. 13A, and Reaction 5 was conducted by flowing the H$_2$S/Ar mixture through the solution:

Reaction 5)

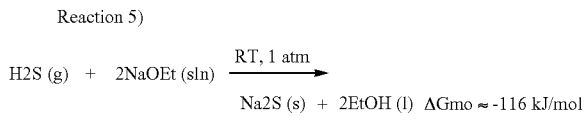

FIG. 13B shows the online QMS signal intensities of the carrier gas Ar (black), and the reactant H$_2$S (red) collected from the reactor effluent during this reaction. Initially, the 10 atom % H$_2$S in Ar flows through a bypass line to establish a baseline reading. When the bypass is closed at t=285 s, both the Ar and H$_2$S fall exponentially with a time constant characteristic of the gas dynamics of the sampling apparatus. At t=377 s, the inlet and outlet valves of the reactor are opened simultaneously; and the Ar signal immediately returns to its original value. In contrast, the H$_2$S signal continues to decay, and eventually drops below the detection limit of the instrument. This indicates that at a minimum >99.9% of the H$_2$S supplied is consumed. The mass spectrum obtained during the bypass mode (FIG. 13C, black) clearly shows the expected fragments of H$_2$S across mass/charge (m/z) ratios of 32-34; on the contrary, the spectrum taken from the effluent (FIG. 13C, red) indicates no H$_2$S. However, a significant signal is recorded from the ethanol (m/z=31) that is regenerated during reaction 2. The absence of any H$_2$S in the effluent demonstrates that the reaction is spontaneous and proceeds to completion very rapidly at ambient temperature and pressure. The collection yield of M₂S product is ~63%, due to the loss during solution transferring and centrifugation, in addition to some dissolution of alkali sulfide into ethanol.

The phase purity and morphology of the solid product are studied. The XRD pattern of the solid product shown in FIG. 13D (red) matches that of the Na₂S standard (black), indicating the production of anhydrous, phase-pure, and crystalline Na₂S. According to the Scherrer equation, which correlates crystalline domains with peak width, Na₂S crystals are ~30 nm in diameter. The SEM images (FIG. 13E) show that Na₂S nanocrystals aggregate as cubic particles of about 100 nm. According to the EDX results, there are peaks of Na, S, oxygen (O) and carbon (C). The O peak in EDX results from the air adsorption during the sample transferring from the Ar atmosphere container to the detector. The C signal is from the carbon tape used to immobilize the sample powder on the aluminum stub. The atomic ratio of Na to S is 1.95, very close to the theoretical value of 2, which is a strong sign of the pure Na₂S production from the reaction.

The thermal stability of the product is analyzed using TGA, shown in FIGS. 15A-15B. The synthesized Na₂S was dried and cleaned at 300° C. for 10 hours under Ar (denoted as s-Na₂S) to remove any possible adsorbed organic solvent, denoted as s-Na₂S. For comparison, commercial Na₂S.9H₂O (c-Na₂S.9H₂O) was annealed at 300° C. for 10 hours under Ar to get pure Na₂S, denoted as c-Na₂S. For Na₂S.9H₂O (FIG. 15A, black line), the abrupt weight loss of ~70% from 140° C. to 200° C. is even higher than the mass percent of H₂O in Na₂S.9H₂O (67.5%) due to some random errors, indicating the sample was fully dehydrated below 200° C. Thus, annealing at 300° C. for 10 hours under Ar is believed to be effective to get pure Na₂S from Na₂S.9H₂O. In addition, XRD patterns for s-Na₂S and c-Na₂S (FIG. 15B) show that pure and crystalline Na₂S is obtained after the annealing step. The TGA results show that s-Na₂S (FIG. 15A, red line) has comparable purity to c-Na₂S (FIG. 15A, blue line), as indicated by their nearly identical weight loss profiles.

H₂ Quantification for the Model Reaction

The H₂ production and separation is easy, as the H₂ recovery from the reaction of Na with EtOH (Reaction 6) is decoupled from the H₂S consumption (Reaction 5) and in both steps different chemicals exist in different phases. FIG. 16A is a representative mass spectrum of the reactor headspace following the reaction of 30 mg Na with 0.63 ml EtOH in 40 ml DME. Hydrogen is the predominant species detected along with the Ar carrier gas as well as signatures from the volatile ethanol and DME. The inset of FIG. 16B shows the flowrate of H₂, calculated based on the calibration line (FIG. 14A) and the experimental QMS intensity ratio of H₂ to Ar (FIG. 14B). FIG. 16B is the integrated volume of H₂, and it is in very good agreement with the theoretical value based on the initial amount of Na supplied to the reactor. The H₂ recovery yield is as high as 98%, demonstrating that Reaction 6 proceeds stoichiometrically to completion under ambient conditions.

Reaction 6)

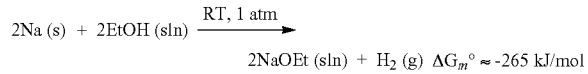

$$2Na(s) + 2EtOH(sln) \xrightarrow{RT, 1\ atm} 2NaOEt(sln) + H_2(g) \quad \Delta G_{rxn}^\circ \approx -265\ kJ/mol$$

Regeneration of Ethanol and DME in the Model Reaction

After Reaction 5, the supernatant was collected and analyzed using ¹HNMR to confirm the complete transformation from NaOEt to EtOH (FIG. 17C). For comparison, the solution of EtOH/DME before reacting with Na (FIG. 17A), and the solution obtained after the completely reaction of Na in EtOH/DME (denoted as NaOEt-EtOH/DME, FIG. 17B) were characterized using ¹HNMR as well. There are peaks of DME (two singlet peaks centered at ~3.22 ppm and ~3.40 ppm for the groups of —CH₃ and —CH₂—, respectively), benzene (singlet centered at ~7.25 ppm) and EtOH (three groups of peaks including a triplet, a singlet, and a quartet for CH₃—, —OH— and —CH₂—, respectively) for all three solutions. The triplet and quartet result from CH₃— and —CH₂— hydrogens spin-spin coupling. DME, as the solvent in the solutions, exhibits much higher intensity, so a break on the vertical axis is introduced from 2 to 50 for the DME peaks in the figure.

Comparing three ¹HNMR figures of FIGS. 4A, 4B and 4C for the solutions of EtOH/DME, NaOEt-EtOH/DME and supernatant, respectively, the chemical shift of DME is the same because the solvent is not affected by the reactions. The most prominent changes are the chemical shifts of —CH₃ and —CH₂— groups in EtOH. Before adding Na, pure EtOH in DME shows the NMR triplet centered at ~1.158 ppm, and the quartet centered at ~3.600 ppm for —CH₃ and —CH₂— groups, respectively. However, higher chemical shifts at ~1.199 ppm, and ~3.671 ppm for —CH₃ and —CH₂— in NaOEt-EtOH/DME are observed. Another difference is that a new singlet at ~5.34 ppm emerges in the solution of NaOEt-EtOH/DME, which is probably due to NaOH formed from the hydrolysis of NaOEt because of possible air exposure during the NMR test. After the reaction of NaOEt-EtOH/DME with H₂S, the NMR peaks for —CH₃, and —CH₂— groups shift back to the same positions as EtOH/DME; in addition, no singlet at ~5.34 μm exists in the supernatant, indicating no Na ions in the supernatant and the full recovery of EtOH.

Furthermore, the ratio of EtOH to DME is calculated and compared using the peak intensity of —CH₃ group in EtOH (insets in FIG. 17A-FIG. 17C) and —CH₃ group in DME to further confirm the complete conversion from NaOEt to EtOH. For EtOH/DME, the ratio is 0.0115. For NaOEt-EtOH/DME, the number decreases to 0.0104, due to the consumption of EtOH to produce H₂. As expected, after the reaction of NaOEt-EtOH/DME with H₂S, the ratio increases to 0.0113 in the supernatant which is almost identical to the value of EtOH/DME. Thus, it may be that protons from H₂S are fully captured by NaOEt to form EtOH.

With the full recovery of EtOH, the supernatant was recycled to react with Na to regenerate NaOEt for the next round of Na₂S nanocrystal synthesis. Time evolution of QMS (FIG. 17D) and mass spectrum of the 2$^{nd}$ round of the Na₂S synthesis (FIG. 17E) are identical to the 1$^{st}$ round using a fresh reagent and solvent. In addition, phase pure Na₂S nanocrystals are produced according to the XRD results (FIG. 17F), validating the potential of recycling EtOH and solvent. The crystal size according to the Debye-Scherrer equation is ~40 nm, slightly larger than that of the first-round-produced particles. This may be ascribable to the higher NaOEt concentration in DME, a small amount of which is lost during the first round of reaction and centrifugation.

Synthesis of Li$_2$S and M$_2$S Morphology Control

Our synthesis strategy is also applicable to Li$_2$S nanomaterials, shown as Reaction 7 and Reaction 8.

Reaction 7)
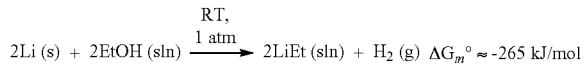
$$2\text{Li (s)} + 2\text{EtOH (sln)} \xrightarrow{\text{RT, 1 atm}} 2\text{LiEt (sln)} + \text{H}_2 \text{(g)} \quad \Delta G_{rn}° \approx -265 \text{ kJ/mol}$$

Reaction 8)
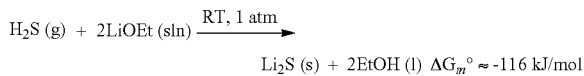
$$\text{H}_2\text{S (g)} + 2\text{LiOEt (sln)} \xrightarrow{\text{RT, 1 atm}}$$
$$\text{Li}_2\text{S (s)} + 2\text{EtOH (l)} \quad \Delta G_{rn}° \approx -116 \text{ kJ/mol}$$

LiOEt is used to replace NaOEt for the Li$_2$S nanocrystals synthesis. However, where the synthesis of Na$_2$S was found to be very robust, Li$_2$S was more challenging and was a strong function of the solvent employed. The first approach was to use DME as the solvent and although H$_2$S abatement using LiOEt-EtOH/DME is very fast and complete (FIG. 18A and FIG. 18B), the XRD pattern of the solid product (red) in FIG. 18C matches with the pattern of LiOEt (blue), rather than Li$_2$S (black), indicating that the reaction of LiOEt-EtOH/DME with H$_2$S cannot form Li$_2$S NPs. Considering the fast and complete consumption of H$_2$S by LiOEt-EtOH/DME, it is possible that the resulting nanosheet crystals (FIG. 18D) are a complicated complex that may include solvent. An important distinction between the NaOEt and LiOEt solutions in DME is that the addition of DME into the solution of LiOEt in EtOH causes serious precipitation while no changes occur upon the addition of DME for the NaOEt system. Hence replacing the DME solvent is reasonable. 2-MeTHF and dioxane displayed similar behavior as DME. The solutions of LiOEt-EtOH/2-MeTHF and LiOEt-EtOH/dioxane are cloudy and consume H$_2$S completely and instantly. However, the products from these two reactions are not Li$_2$S shown in FIGS. 19A-19B.

DBE, toluene and hexane were found to be suitable solvents for the successful synthesis of Li$_2$S NPs. The solutions of LiOEt-EtOH/toluene and LiOEt-EtOH/hexane are clear, while the solution of LiOEt-EtOH/DBE is a little cloudy. All three solutions react with H$_2$S instantly and completely at room temperature, and pure Li$_2$S NPs are generated. The XRD patterns of the pristine solid products (red) from these three reactions shown in FIGS. 20A, 5C and 5E match the Li$_2$S standard pattern (black). The crystalline sizes extracted using Scherrer analysis are 12, 14, and 19 nm for solid products using DBE, toluene and hexane, respectively. When using DBE, flake-shaped crystals are formed (FIG. 20B). The toluene system produces spike-shaped particles of ~300 nm in width (FIG. 20D) and the hexane system generates irregular shaped NPs of ~100 nm (FIG. 20F). As the experimental conditions for Na$_2$S and Li$_2$S synthesis are similar, the different results herein indicate that the choice of solvent may provide for the morphology control and that sodium ethoxide and lithium ethoxide have different nucleation/growth kinetics. This can be corroborated by the facts that Li$_2$S has much higher solubility than Na$_2$S and that chemicals with higher solubility typically precipitate in smaller crystal sizes.

The results presented to this point show that one advantage of this solution based synthesis approach is that the size and morphology of the resulting nanostructures may be manipulated through selective choice of solvent and/or reagent. The ideal alcohol accomplishs two tasks. It has sufficient reactivity to efficiently form the alkoxide intermediate and release H$_2$ (Reaction 3). In addition, M$_2$S should be insoluble in the solution to ensure the full recovery of M$_2$S as solid precipitates (Reaction 2). Straight chain alcohols ranging from ethanol to octanol were considered. Both reactivity and M$_2$S solubility decrease with increasing molecular weight. Although M$_2$S is insoluble in higher alcohols, reactivity limitations restrict our practical choices to ethanol and butanol. Both Li$_2$S and Na$_2$S exhibit some solubility in lower alcohols, but this issue is largely mitigated by using the minimum amount of alcohol in combination with a solvent.

In order to control the Na$_2$S morphology, different combinations of alcohols (ethanol or butanol) and solvents (DME, DBE, dioxane, 2-MeTHF, hexane or toluene) have been analyzed. All the reactions proceed to completion very rapidly at ambient temperature and pressure. The disclosed process succeeded in synthesizing morphology-controlled Na$_2$S NPs and secondary clusters (SCs), which are micrometer-sized entities of assembled NPs. FIGS. 21A-21F display the impact of alcohol and solvent choice on the Na$_2$S morphology tuning.

The combination of ethanol and DME (FIG. 21A) has been discussed above. Spherical SCs, which are self-assembled from primary particles, are generated from the reaction of NaOEt-EtOH/2-MeTHF with H$_2$S (FIG. 21B) and NaOEt-EtOH/dioxane with H$_2$S (FIG. 21C). The size, in at least one measureable dimension, of SCs is about several micrometers and the primary particles are ~200 nm. In some embodiments the primary particless may be less than about 200 nm or greater than about 200 nm, and the SCs maybe 1, 2, 3, 4, or more micrometers in at least one measurable dimension. The advantage of SCs versus NPs in advanced rechargeable batteries is that SCs can improve the electrode performance because they can integrate the advantages of both bulk materials (high energy density) and NPs (high specific energy and cycling stability). Compared with conventional methods of synthesizing SCs by assembling pre-made NPs, our method does not need surfactants. Thus, this success provides for the ability to develop an advantageous method of making M$_2$S NPs and SCs.

When using butanol reactant and DME solvent (FIG. 21D), well dispersed Na$_2$S NPs of ~200 nm are obtained. The reaction conditions of butanol in 2-MeTHF (FIG. 21E) and butanol in dioxane (FIG. 21F) give us agglomerated Na$_2$S particles. FIGS. 22A-22F is the XRD patterns for all Na$_2$S products from the above six reactions. The crystal sizes calculated according to Scherrer equation for all the produced Na$_2$S are summarized in Table I. The primary particle size extracted from XRD was very similar for all systems at ~30 nm. Thus, the substantial differences in morphologies and sizes of the Na$_2$S products shown in FIGS. 21A-21F primarily reflect changes in the propensity of these NPs to aggregate.

The resulting morphology is a complex function reflecting the relative rates of nucleation, growth, transportation and aggregation kinetics. Possible factors that influence the solid morphology include the solvents' viscosity, surface tension, polarity, dielectric constants, etc. Viscosity and surface tension influence the reaction dynamics and transportation. The main factors affecting the crystal aggregation include solvent polarity and dielectric constant. In general, dielectric constant is used as a rough measure of a solvent's polarity. According to the previous study, crystals usually do not tend to self-assemble or aggregate in polar organic solvents due to the weak interparticle electrostatic interactions. Hence, high solvent polarity and high dielectric constant indicate low possibility of aggregation, which can be used to explain the well-dispersed NPs in the DME solution, compared to the 2-MeTHF and dioxane solutions. As for different morphologies when using different alcohol reagents, the main factor may be the molecular size, considering the fact that the volume of alcohols is as low as 1/40 of that of solvents. With a longer chain than ethanol, 1-butanol tend to prevent the clusters to aggregate during transportation. Though not fully understood at this point, it has been demonstrated that the size and shape of both $Li_2S$ and $Na_2S$ may be manipulated using different solvent/reagent combinations. The ability to tune NP size and shape is viewed as unique and beneficial.

Figure 24A:
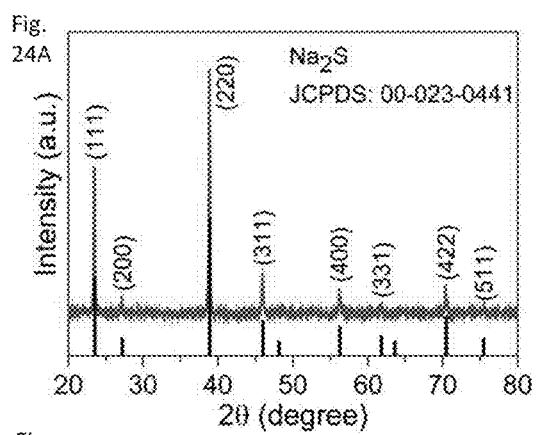
Figure 24B:
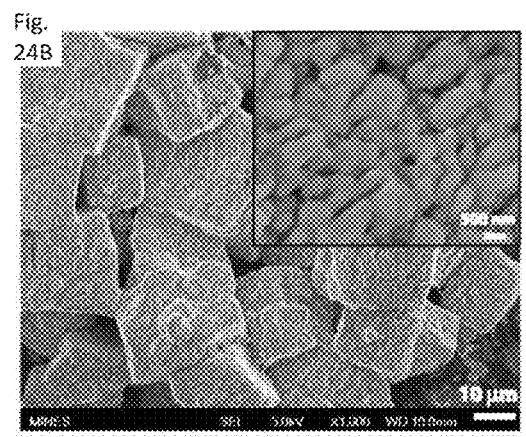
Figure 24C:
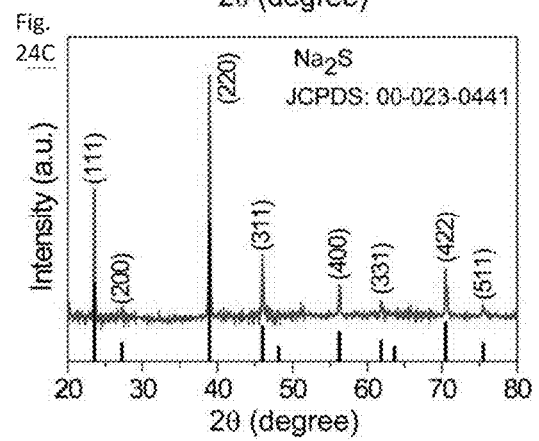
Figure 24D:
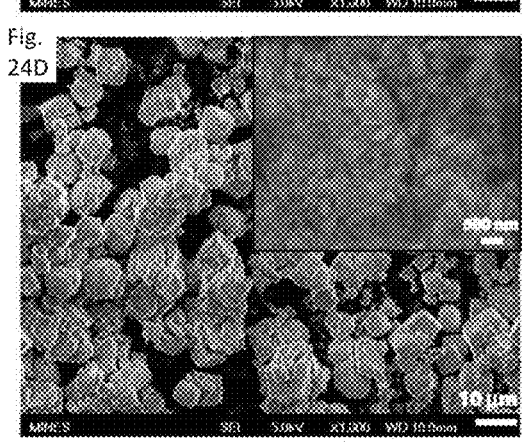

In general, the $Na_2S$ synthesis is robust for most conditions. The exception is DBE, toluene and hexane, which produced a mixture of $Na_2S$ and NaHS (FIGS. 23A-23C). However, by tuning the molar ratio between NaOEt and $H_2S$, pure, crystalline, and cube-like $Na_2S$ SCs are produced in the toluene and hexane reactions. In the toluene reaction system, when the molar ratio of NaOEt to $H_2S$ is 2.60, pure $Na_2S$ SCs of 5-20 μm with a good size distribution are obtained, which are assembled from grain-like $Na_2S$ NPs of ~500 nm consisting NCs of ~40 nm (FIG. 24A and FIG. 24B). When using hexane as the solvent (FIG. 24C and FIG. 24D) and at the molar ratio of 2.44 between NaOEt and $H_2S$, decently-dispersed polyhedral SCs of 1-10 μm are produced, which also consist of grain-like $Na_2S$ NPs of ~250 nm with the crystalline sizes of ~45 nm. In both systems, the molar ratio of NaOEt to $H_2S$ is higher than the stoichiometric value of 2, meaning that some unreactive NaOEt exists in the solution, leading to a lower yield. When the molar ratio reaches the stoichiometric value of 2, the mixture of NaHS and $Na_2S$ is obtained, indicating that two competing reactions (Reaction 5 and Reaction 9) co-exist in the solution. When the $Na_2S$ product concentration is getting higher, kinetics of Reaction 9 is higher than that of Reaction 5. Hence, the mixture of NaHS and $Na_2S$ is produced. Based on the analysis, it is very possible that pure $Na_2S$ can be obtained from the condition of DBE by tuning the molar ratio between two reactants. However, the yield will be low so this system was not further pursued.

9)

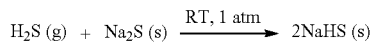

$$H_2S(g) + Na_2S(s) \xrightarrow{RT, 1\ atm} 2NaHS(s)$$

TABLE I

Crystal size of the $Na_2S$ products calculated from the XRD patterns in FIGS. 22A-22F.

| Alcohol | Solvent | | |
| --- | --- | --- | --- |
|  | DME | 2-MeTHF | Dioxane |
| Ethanol | 30 nm | 17 nm | 32 nm |
| Butanol | 38 nm | 23 nm | 25 nm |

TABLE II

Factors that may affect the $M_2S$ morphology.

| Properties | Molecular Size (g/mol) | Relative Polarity[a] | Dielectric Constant (25° C.) |
| --- | --- | --- | --- |
| DME | 90.12 | 0.231 | 7.2 |
| Dioxane | 88.11 | 0.164 | 2.25 |

TABLE II-continued

Factors that may affect the $M_2S$ morphology.

| Properties | Molecular Size (g/mol) | Relative Polarity[a] | Dielectric Constant (25° C.) |
| --- | --- | --- | --- |
| 2-MeTHF | 86.13 | ~0.207[b] | 6.97 |
| Ethanol | 46.07 | 0.654 | 25 |
| 1-Butanol | 74.12 | 0.586 | 18 |

[a]The values for relative polarity are normalized from measurements of solvent shifts of absorption spectra and were extracted from Christian Reichardt, Solvents and Solvent Effects in Organic Chemistry, Wiley-VCH Publishers, 3rd ed., 2003.
[b]The relative polarity of 2-MeTHF is considered close to that of THF (0.207).

Conclusion

Thus, disclosed herein is a simple and scalable method of synthesizing anhydrous sodium sulfide ($Na_2S$) and lithium sulfide ($Li_2S$) nanocrystals by through reactive precipitation using alkali metal alkoxide (MOR) with hydrogen sulfide ($H_2S$) as reagents. The morphology of $M_2S$ nanocrystals and their ability to assemble into secondary clusters can be tuned by changing alcohol reagents or/and organic solvents. The reaction is thermodynamically spontaneous, fast, complete, and irreversible at ambient temperature and pressure. Abatement of $H_2S$ is complete, and the valuable hydrogen stored within may be recovered during regeneration of organic solution. Recovery of $M_2S$ NPs and $H_2$ occur in separate steps facilitated by their natural phase separation, and successful recycling of the organic solution was demonstrated. These chemical transformations occur with high atom economy as it was shown that $H_2$ recovery approached theoretical limits and high conversion of alkali metal to $M_2S$ NPs was observed. These results clearly manifest the potential of this green approach to scalable manufacturing of these nanomaterials that are expected to be critical to next generation battery applications. Work is ongoing to better understand the nucleation/growth kinetics and to evaluate these materials in battery applications.

Example 2

Napathalene as Organic Complexing Agent

A reagent solution is prepared by dissolving an alkali metal in an organic complexing agent. In some embodiments, naphthalene (NAP, $C_{10}H_8$) may be the organic complexing reagent (R). In most embodiments, naphthalene can be used to dissolve sodium and lithium. In these embodiments, synthesis of both $Na_2S$ NPs and $Li_2S$ NPs was achieved. In these embodiments, the reaction observed was:

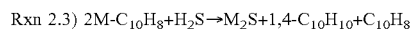

Rxn 2.3) $2M-C_{10}H_8 + H_2S \rightarrow M_2S + 1,4-C_{10}H_{10} + C_{10}H_8$

When naphthalene was used, hydrogen gas was not directly released. Instead the hydrogen from the $H_2S$ is captured in the form of 1,4-hydrogennaphthalene (1,4-$C_{10}H_{10}$), which is commonly known as dialin. However, in these embodiments, the reaction may be spontaneous, rapid, and complete at room temperature, and may consume the $H_2S$ reducing $H_2S$ to below the detection limits (>99.9%). X-ray diffraction (XRD) and scanning electron microscopy (SEM) can be used to confirm the formation of phase-pure anhydrous $Na_2S$ and $Li_2S$ NPs (FIGS. 25A-25D). NPs may also be characterized using thermogravimetric analysis (TGA). In these embodiments, $Li_2S$ NPs may have nominally identical weight loss profiles as commercial standards. The yield of $Li_2S$ NPs based on the initial mass of Li used to generate the complex was >95%, very good considering inevitable loss of some product during handling, washing, and recovery.

The electrochemical potential of the synthesized $Li_2S$ NPs (n-$Li_2S$) was benchmarked against commercial micropowders (μ-$Li_2S$) procured from Alfa-Aesar. First, simple cathodes were fabricated from mixtures of $Li_2S$ (40 wt %), acetylene black (45 wt %), and PVDF binder (15 wt %) using the standard slurry method. Half-cell batteries were assembled using lithium ribbon as the anode and 1.0 M Lithium bis(trifluoromethanesulfonyl)imide (LiTFSI) in Tetraethylene glycol dimethyl ether (TEGDME) as the electrolyte and tested by cyclic voltammetry (CV) and galvanostatic cycling. The CV results display the redox peaks expected of Li—S batteries, and FIG. 26 compares the capacity and stability of our n-$Li_2S$ cathodes with μ-$Li_2S$. Both the initial charge capacity of (724 vs. 420 mAh/g) and the stability of the n-$Li_2S$ cathodes is far superior to the micropowder-based counterparts. These results validate the disclosed material's potential, as well as the disclosed method's and system's ability to produce $M_2S$ nanoparticles. Despite the fabrication method used to produce this embodiment, the resulting electrodes compare quite favorably with typical $Li_2S$ electrodes. Thus, demonstrating the high quality of the disclosed NP material synthesized by the disclosed process and system.

Example 3

The Alcohol Process

The results using naphthalene were very encouraging, but a few aspects could be further improved. As mentioned above hydrogen is not directly released in reaction 3 but captured in the form of dialin. Although dialin is a commercial solvent with added value, recovering $H_2$ directly would be economically preferred. Moreover, recycling/regeneration of the organic reagent as depicted in Scheme 1 is not straightforward in the naphthalene system. It was realized that another embodiment of the process was possible by replacing naphthalene with alcohol as the complexing reagent. NP synthesis and $H_2S$ abatement are accomplished in one step (Rxn 4), with $H_2$ recovery and reagent regeneration occurring in the second (Rxn 3.5). Both reactions are thermodynamically favorable, with the net consequence (Rxn 3.6) completing the ideal reaction sequence proposed in Scheme 1. $H_2$ recovery is completely decoupled from $H_2S$ abatement, precluding the need for their separation.

Rxn 3.4)

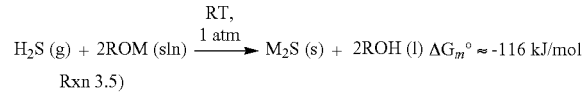

Rxn 3.5)

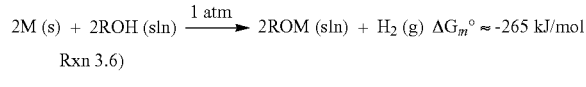

Rxn 3.6)

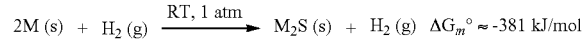

This chemistry has been demonstrated in batch mode as illustrated in FIG. 5. In Step 1 of FIG. 5, an $H_2S$/Ar gas mixture is bubbled through the metal alkoxide (ROM) solution, generating $M_2S$ NPs as expressed in Rxn 3.4. FIG. 5 shows on line QMS data from this step. The feed was first characterized by diverting the gasses through the bypass. At t~150 s the signals drop when the 3-way valves were closed to redirect the flow to the reactor. At t~200 s the outlet was opened and the Ar signal returned to its original value while $H_2S$ continued to fall to the detection limit of the QMS. Comparison of the bypass and effluent spectra confirm complete $H_2S$ abatement during this step (>99.9%). The resulting NPs are suspended in solution and recovered by centrifugation (Step 2). In Step 3 the ROH-containing supernatant is removed and reacted with fresh alkali metal to regenerate the ROM reagent (Rxn 3.5). FIG. 5 shows QMS analysis of the resulting head space confirming that $H_2$ is the only gas-phase product detected along with signatures from the Ar carrier gas and DME solvent. In addition, the integrated volume of $H_2$ recovered in this step exceeds 98% of the theoretical value, confirming the high atom economy of this process. Lastly, this regenerated solution was then reacted with $H_2S$ to synthesize a new batch of $M_2S$ NPs, whose composition, morphology, and yield were nominally identical to those synthesized with fresh reagents, demonstrating the potential for recycling.

Choice of Alcohol (Reagent) and Solvent

An advantage of the disclosed process and system is the ability to manipulate/select the size and morphology of the resulting nanostructures. In some embodiments, this selection may be accomplished by the selection from among various solvent and/or various reagent. In most embodiments, an alcohol for use with the disclosed method should have sufficient reactivity to efficiently form the alkoxide intermediate and also release $H_2$ (Rxn 3.5). In addition, the $M_2S$ should be have low or no solubility in the alcohol to aid in recovery of $M_2S$ as solid precipitates (Rxn 3.4). In many embodiments, an alcohol can be selected from straight chain alcohols ranging from ethanol to octanol. In many embodiments, reactivity and $M_2S$ solubility may decrease with increasing molecular weight of the alcohol. Although $M_2S$ was insoluble in higher alcohols, reactivity was also decreased, which may, in many embodiments, result in alcohols from ethanol-butanol to be preferred. $Li_2S$ and $Na_2S$ may be at least partly soluble in lower alcohols. However, in most embodiments where a lower alcohol is used, solubility of the $M_2S$ may be balanced by minimizing the amount of alcohol used, and combining it with an appropriate solvent.

Factors that influence solvent choice include its polarity, transport parameters, volatility, cost, and ease of handling. Table III summarizes the physical properties of various solvents that may be used with the present method. Viscosity (μ) and surface tension (σ) influence bubble column dynamics, while density (ρ and volatility (BP) strongly impact separation and purification.

TABLE III

Properties of the solvents employed to date and their success in yielding $M_2S$ NPs.

| Solvent | Formula | μ (cP) | σ (mN/m) | ρ (g/cm³) | BP (° C.) | $Na_2S^1$ | $Li_2S^1$ |
|---|---|---|---|---|---|---|---|
| DME | $C_4H_{10}O_2$ | 1.10 | 20 | 0.868 | 85 | ☺ | ↧ |
| DBE | $C_8H_{18}O$ | 0.74 | 23 | 0.769 | 142.4 | ↧ | ☺ |
| Dioxane | $C_8H_{18}O$ | 1.18 | 33 | 1.033 | 101.1 | ☺ | ? |
| MeTHF | $C_8H_{18}O$ | 0.60 | n/a | 0.854 | 80.2 | ☺ | ? |

TABLE III-continued

Properties of the solvents employed to date and their success in yielding $M_2S$ NPs.

| Solvent | Formula | μ (cP) | σ (mN/m) | ρ (g/cm³) | BP (° C.) | $Na_2S^1$ | $Li_2S^1$ |
|---|---|---|---|---|---|---|---|
| Hexane | $C_6H_{14}$ | 0.30 | 18.4 | 0.655 | 69 | ☺ | ☺ |
| Toluene | $C_7H_8$ | 0.59 | 28.9 | 0.870 | 111 | ☺ | ☺ |
| Water | $H_2O$ | 1.00 | 72.8 | 1.000 | 100 | Bubble Column | |
| IPA | $C_3H_8O$ | 2.37 | 21.7 | 0.786 | 82.6 | Characterization | |

1-'☺'indicates high yield synthesis of phase pure, anhydrous nanocrystals. $Na_2S$ synthesis was confirmed using both ethanol and butanol; $Li_2S$ synthesis was confirmed with ethanol alone.

In many embodiments, there may be a complex relationship between alcohol, alkali metal, and solvent, and various combinations may result in NPs with different or the same morphologies. While the tested combination embodiments resulted in complete $H_2S$ abatement and $H_2$ generation, there were differences in $M_2S$ purity, yield, and morphology. In many embodiments, sodium proved to be quite robust, with high yields of anhydrous $Na_2S$ NPs achieved for most combinations explored. In some embodiments, for example where dibutyl ether (DBE) is used, a mixture of $Na_2S$ and NaHS may be formed.

Figures 27, 28A, 28B, 28C, 28D:
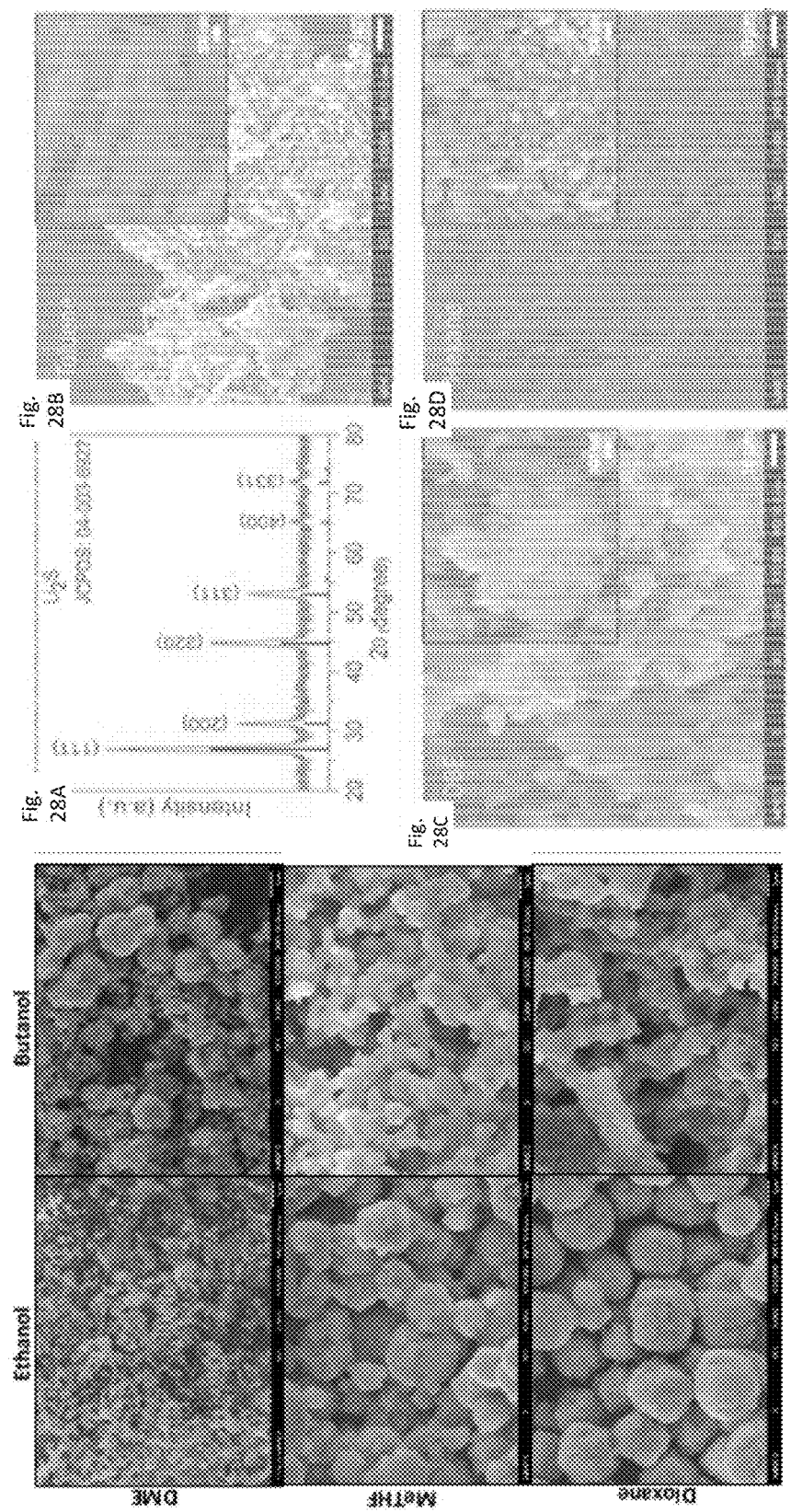
FIG. 27 shows SEM characterization at 10,000× magnification of $Na_2S$ NPs derived from alcohol/solvent combinations.
FIGS. 28A-28D shows representative XRD pattern (28A) and SEM images of Li2S nanocrystals synthesized with various solvents (28B-28D).

FIG. 27 displays the impact of alcohol and solvent choice on $Na_2S$ morphology. In many embodiments, particle size may range from about 20-100 nm. In some embodiments, particles may form secondary clusters that are greater than 100 nm, for example in the micron size range. In one embodiment, for example where ethanol and dioxane are combined, the primary particles self-organized into micron size secondary clusters.

In many embodiments, different metals may produce different NPs. For example, lithium particles formed nanoparticles with different characteristics, compared to sodium. In many embodiments, lithium in butanol was less reactive than lithium in ethanol, which formed anhydrous, phase pure $Li_2S$ NPs in combination with a variety of solvents (FIGS. 28A-28D). In many embodiments, the morphology of the resulting NPs can be selected based on the identity of the metal, solvent, and reagent used. In various embodiments, $Li_2S$ NPs may result in flake-shaped morphologies. In some embodiments, relative rates of nucleation, growth, and aggregation kinetics may also affect morphology.

The results summarized in Table III illustrate the complexity of the reagent-metal-solvent chemistry. For example, the solvent DME worked great for $Na_2S$ synthesis with all reagents and for $Li_2S$ when using naphthalene, but it yielded a mixture of compounds when using ethanol. In contrast, DBE worked well for $Li_2S$ but failed for $Na_2S$ when using ethanol.

In addition to reactivity and solubility, transport is expected to significantly impact morphology, in particular the ability of NPs to assemble into secondary clusters. In many embodiments, the disclosed methods and systems may be used to tune NP size and shape, but selecting among various metals, reagents, and solvents. In many embodiments, NPs resulting from the disclosed methods may range from several nanometers to several micrometers. For example, the disclosed nanoparticles may be greater than about 5 nm, 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, 1100 nm, 1200 nm, 1300 nm, 1400 nm, 1500 nm, 2000 nm, or 3000 nm, and less than about 3500 nm, 3000 nm, 2500 nm, 2000 nm, 1500 nm, 1400 nm, 1300 nm, 1200 nm, 1100 nm, 1000 nm, 900 nm, 850 nm, 800 nm, 750 nm, 700 nm, 650 nm, 600 nm, 550 nm, 500 nm, 450 nm, 400 nm, 350 nm, 300 nm, 250 nm, 200 nm, 150 nm, 100 nm, 90 nm, 80 nm, 70 nm, 60 nm, 50 nm, 40 nm, 30 nm, 200 nm, or 10 nm. In various embodiments, the disclosed nanoparticles may range from about 10-30 nm, which may be generally preferred for some cathode applications. In other embodiments, for example where the nanoparticles are used for electrolyte formulation, the size range may be about 500-1000 nm.

Nanoparticles resulting from the disclosed methods may have high purity. In some embodiments the purity may be greater than about 80%, 85%, 86%, 87%, 88%, 89%, 90%, 91%, 92%, 93%, 94%, 95%, 96%, 97%, 98%, 98.5%, 98.6%, 98.7%, 98.8%, 98.9%, 99%, 99.1%, 99.2%, 99.34%, 99.5%, 99.6%, 99.7%, 99.8%, or 99.9% and less than about 100%, 99.9%, 99.8%, 99.7%, 99.6%, 99.5%, 99.4%, 99.3%, 99.2%, 99.1%, 99%, 98.9%, 98.8%, 98.7%, 98.6%, 98.5%, 98.4%, 98.3%, 98.2%, 98.1%, 98%, 97%, 96%, 95%, 94%, 93%, 92%, 91%, 90%, 89%, 88%, 87%, 86%, 85%, or 84%.

Example 4

$Na_2S$ Nanoparticle Synthesis Using DME and Ethanol and Bubble Column Reactor FIG. 7 is a series of photographs of one embodiment of a bubble column reactor taken during the synthesis of $M_2S$ NP using the disclosed methods. This embodiment used a combination of Na, ethanol, and DME. As depicted in the photo to the left, before $H_2S$ introduction the solution in the bubble column is transparent, and this photograph, taken at t=0, shows the original bubble distribution under Ar flow. At t=0 $H_2S$ was introduced at 4 sccm while keeping the total volumetric flowrate constant (80 sccm). The reaction appears instantaneous and accumulation of NPs is clearly evident at t=2.5 minutes. In this experiment, as the turbidity increased, it was increasingly difficult to resolve individual bubbles, until about 5 minutes when individual bubbles could not be identified. The disclosed column, shown in FIG. 7, was well-behaved and QMS analysis confirmed complete $H_2S$ abatement throughout the experiment. At t=10 minutes the stoichiometric amount of $H_2S$ had been delivered and the gas flow was stopped. At this point, NPs were still suspended in the solution.

XRD and SEM analysis was performed on the reaction products. As shown in FIG. 7, these tests confirmed the morphology and purity of the resulting $Na_2S$ nanocrystals. Comparing the resulting particles with those formed using a Parr reactor (FIG. 27) indicates that the morphology of the resulting nanoparticles may be altered depending upon the type and characteristics of the reactor used. These results indicate that transport characteristics may be used to tune size, shape, and level of aggregation of the nanoparticles produced from the disclosed method.

Example 5

Synthesis of $Li_2S$—NCs@PAN Composite

Synthesis of an $Li_2S$—NCs@PAN composite was performed using DMF as the solvent. All observable XRD peaks can be indexed to $Li_2S$, referring to the standard (JCPDS 04-004-2753). The fact that the peaks are weak and broad implies small crystal sizes. In most embodiments, small size crystals are desirable. The high background is likely due to the polymer matrix and the XRD substrate. An SEM image illustrates the typical morphology of polymer. The invisibility of particles that resemble $Li_2S$—NCs is consistent with the XRD result and implies the good quality of the polymer encapsulation. Optical images show the distinct colors of the reaction solutions before and after introducing $H_2S$.

Assessments of the Electrode Performance

Fabrication of electrodes with the disclosed products is conducted in a glove box by using the standard slurry method. In many embodiments, a first step involves placing appropriate amounts of dry $Li_2S$ powder ('s-$Li_2S$' produced by the disclosed method), acetylene black, and PVDF binder in a mortar prior to manual blending to create a mixture. This mixture is then dispersed in an appropriate amount of N-methyl-2-pyrrolidone (NMP), and stirred, for example overnight, to create a homogeneous slurry. The obtained homogenous slurry may then be bladed onto a carbon paper current collector (e.g. AvCarbP50) and then dried at about 110° C. for about 6 hours, to create electrodes. The electrodes are then cut into small discs. The mass loading of $M_2S$ is ~1.0 mg/cm². Last, Swagelok cells batteries or coin cells are assembled by using lithium ribbon as the anode, polypropylene membrane (Celgard 2500) as the separator, and 1.0 M lithium bis(trifluoromethane)sulfonimide (Li-TFSI) in tetra(ethylene glycol)dimethyl ether (TEGDME) as the electrolyte solution. For benchmarking purposes, the identical procedure is used to fabricate electrodes with commercially sourced $Li_2S$ (c-$Li_2S$).

Electrode cyclability can be examined by the galvanostatic cycling technique on a multiple-channel battery analyzer. In this case a constant charging/discharging current (typically at 0.1 C, 1 C=1166 mA/g for $Li_2S$) is applied within a potential window. As shown in FIG. 11A electrodes fabricated using the disclosed $Li_2S$ synthesis method (s-$Li_2S$) is superior to electrodes comprising commercially sourced $Li_2S$ (c-$Li_2S$). For example, the initial charge (delithiation) capacity is 724 mAh/g for s-$Li_2S$, comparing well with the theoretical limit (1166 mA/g). The half-life, defined as the cycles spent to reach 50% of the initial charge capacity, is 45 cycles for s-$Li_2S$. In contrast, the initial charge capacity of c-$Li_2S$ is only 272 mAh/g, while in the second cycle the charge capacity bounces to 424 mAh/g. The stability of c-$Li_2S$ declines in a similar fashion, but reaches its half-life after only 23 cycles.

The disclosed $Li_2S$ compares favorably with some existing $Li_2S$ materials. For instance, an $Li_2S$/C nanocomposite made by ball-milling $Li_2S$ micropowder and carbon precursor resulted in an initial specific capacity of 560 mAh/g and 420 mAh/g at the 30$^{th}$ cycle.

Cyclic voltammograms (CVs) may be used to help determine electrochemical reactions during the charging/discharging cycles. Profiles of s-$Li_2S$, shown in FIG. 11B are consistent with those of S and $Li_2S$ electrodes in literature. In the first half cycle, the anodic current with a weak peak at 2.57 V (peak I) corresponds to the delithiation of $Li_2S$ to form sulfur ($S_8$). In the subsequent cathodic scans, three characteristic peaks are observed at 2.44 V (peak II, strong), 2.12 V (peak III, weak) and 1.94 V (peak IV, very strong), respectively. Peak II is assigned to the reduction of $S_8$ to polysulfides ($Li_2S_n$, n=4-8) in three steps. Peak III is from the reduction of $Li_2S_4$ to insoluble $Li_2S_2$. Peak IV is due to the conversion of $Li_2S_2$ to $Li_2S$. In contrast, the subsequent anodic scans only have two distinguishable peaks at 2.39 V (peak V) and 2.53 V (peak VI), which correspond to the oxidations of $Li_2S$ to $Li_2S_n$ and $Li_2S_n$ to $S_8$, respectively.

Electrochemical impedance spectroscopy (EIS) measures the characteristics of charge transfer outside the electrode, at the electrode/electrolyte interface, and inside the electrode. The EIS spectra in FIG. 11C show that the resistance outside the electrode ($R_S$) is ~15Ω in all selected cycles for both states of $S_8$ and $Li_2S$. The charge transfer resistance ($R_{CT}$) at the electrode/electrolyte, which equals the magnitude of the semicircle, decreases with cycling. The smaller magnitude of the linear range for $Li_2S$ (at 1.5 V) than for $S_8$ (at 3.0 V) indicates that the former has a smaller internal charge diffusion resistance (Warburg impedance, $Z_W$). Overall, the little change of $R_{CT}$ and $R_S$ with cycling indicates the stable structure.

We claim:

1. A method of converting a hydrogen sulfide gas to a metal sulfide material, the method comprising:
   combing an alkalai metal and an alcohol to create a metal alkoxide;
   creating an anhydrous solution comprising the metal alkoxide, a polymer, and a solvent;
   flowing a gas through the solution, the gas comprising hydrogen sulfide;
   allowing the hydrogen sulfide gas to react with the metal to form a solid metal sulfide particle, hydrogen gas, and regenerate the alcohol; and
   precipitating the solid metal sulfide and capturing the hydrogen gas; and
   separating the solid metal sulfide precipitate from the alcohol.

2. The method of claim 1, wherein heating of the precipitate creates a secondary cluster of polymer-coated metal sulfide particles.

3. The method of claim 2, wherein the polymer-coated particles are coated with a layer of carbon.

4. The method of claim 1, wherein the polymer is selected from polyvinylpyrrolidone (PVP, [$C_6H_9NO$]n), poly(2-ethyl-2-oxazoline) (PEOZ, [$C_5H_9NO$]n), and polyacrylonitrile (PAN, [$C_3H_3N$]n) and the solvent is selected from Hexane, Toluene, dimethoxyethane (DME), dibutyl ether (DBE), and dimethylformamide (DMF).

5. The method of claim 3, wherein the layer of carbon layer is created by carbonizing the polymer by pyrolysis in an inert environment.

6. The method of claim 1, wherein the alcohol is selected from a straight or branched chain alcohol having between 2 and 8 carbons.

7. The method of claim 6, wherein the alcohol is ethanol.

8. The method of claim 1, wherein the alkali metal is selected from lithium and sodium.

9. The method of claim 7, wherein the alkali metal is sodium.

10. The method of claim 7, wherein the alkali metal is lithium.

11. A method of making a metal sulfide cathode, the method comprising:
    combining an alkali metal and an alcohol, selected from one or more of a methyl, ethyl, propyl, butyl alcohol, to form an alkoxide;
    forming a solution, comprising;
       the alkoxide;
       a solvent, wherein the solvent is selected from one or more of hexane, toluene, dimethoxyethane (DME), dibutyl ether (DBE), and dimethylformamide (DMF); and a polymer, wherein the polymer is selected from polyvinylpyrrolidone (PVP, [$C_6H_9NO$]n), poly(2-ethyl-2-oxazoline) (PEOZ, [$C_5H_9NO$]n), and polyacrylonitrile (PAN, [$C_3H_3N$]n);

wherein the solution is substantially anhydrous;

bubbling an inert gas through the solution;

bubbling hydrogen sulfide through the solution;

allowing the hydrogen sulfide to react with the alkoxide to form a metal sulfide particle, and regenerate the alcohol;

collecting composites of metal sulfide particles and polymers;

increasing the temperature of the composites to a temperature sufficient to remove at least the alcohol or the solvent;

pyrolyzing the composites to create a carbon shell around the particle.

12. The method of claim 11, wherein the alkali metal is selected from lithium and sodium.

13. The method of claim 12, wherein the alkali metal is lithium.

14. The method of claim 13, wherein the solvent is DMF.

15. The method of claim 13, wherein the polymer is PAN.

16. The method of claim 12, wherein the alkali metal is sodium.

17. The method of claim 16, wherein the solvent is DME and the alcohol is ethanol.

18. The method of claim 11, wherein the inert gas is argon.

19. A method of making a lithium sulfide cathode, the method comprising:

combining lithium and ethanol to form an LiOEt;

forming a solution, comprising;
  LiOEt;
  dimethylformamide (DMF); and
  polyacrylonitrile (PAN, [$C_3H_3N$]n);
  wherein the solution is substantially anhydrous;

bubbling argon gas through the solution;

bubbling hydrogen sulfide through the solution;

allowing the hydrogen sulfide to react with the LiOEt to form $Li_2S$, and regenerate ethanol;

collecting composites of $Li_2S$ and PAN;

increasing the temperature of the composites to about 100° C.;

increasing the temperature to between 250-300° C. for about one hour;

increasing the temperature to at least about 400° C. to pyrolyze the PAN.

* * * * *